United States Patent [19]
Bartholomew et al.

[11] Patent Number: 6,167,119
[45] Date of Patent: Dec. 26, 2000

[54] PROVIDING ENHANCED SERVICES THROUGH SIV AND PERSONAL DIAL TONE

[75] Inventors: Dale L. Bartholomew, Vienna; Robert D. Farris, Sterling, both of Va.; Alexander I. McAllister, Silver Spring; Michael J. Strauss, Potomac, both of Md.

[73] Assignee: Bell Atlantic Network Services, Inc., Arlington, Va.

[21] Appl. No.: 09/006,033

[22] Filed: Jan. 12, 1998

Related U.S. Application Data

[63] Continuation-in-part of application No. 08/828,959, Mar. 8, 1997, Pat. No. 5,978,450, and a continuation-in-part of application No. 08/904,936, Aug. 1, 1997, Pat. No. 6,038,305, and a continuation-in-part of application No. 08/997,505, Dec. 23, 1997, Pat. No. 6,101,242.

[51] Int. Cl.$^7$ ...................................................... H04M 3/42
[52] U.S. Cl. ........................................ 379/88.04; 379/207
[58] Field of Search ................................ 379/67.1, 88.01, 379/88.02, 88.03, 88.04, 88.22, 88.26, 201, 207

[56] References Cited

U.S. PATENT DOCUMENTS

| | | |
|---|---|---|
| 4,313,035 | 1/1982 | Jordan et al. . |
| 4,371,752 | 2/1983 | Matthews et al. . |
| 4,551,581 | 11/1985 | Doughty . |
| 4,582,956 | 4/1986 | Doughty . |
| 4,585,906 | 4/1986 | Matthews et al. . |
| 4,602,129 | 7/1986 | Matthews et al. . |
| 4,625,081 | 11/1986 | Lotito et al. . |
| 4,759,056 | 7/1988 | Akiyama . |
| 4,899,373 | 2/1990 | Lee et al. . |
| 4,961,217 | 10/1990 | Akiyama . |
| 5,206,899 | 4/1993 | Gupta et al. . |
| 5,247,571 | 9/1993 | Kay et al. . |
| 5,329,578 | 7/1994 | Brennan et al. ......................... 379/201 |
| 5,422,936 | 6/1995 | Atwell . |
| 5,430,791 | 7/1995 | Feit et al. .............................. 379/88.01 |
| 5,465,290 | 11/1995 | Hampton et al. ......................... 379/207 |
| 5,515,426 | 5/1996 | Yacenda et al. ......................... 379/201 |
| 5,572,583 | 11/1996 | Wheeler, Jr. et al. . |
| 5,661,782 | 8/1997 | Bartholomew et al. . |
| 5,661,791 | 8/1997 | Parker ..................................... 379/207 |
| 5,719,921 | 2/1998 | Vsotsky et al. ......................... 379/189 |
| 5,761,290 | 6/1998 | Farris et al. ............................. 379/207 |
| 5,825,865 | 10/1998 | Oberlander et al. ..................... 379/211 |

*Primary Examiner*—Scott L. Weaver
*Attorney, Agent, or Firm*—McDermott, Will & Emery

[57] ABSTRACT

An intelligent telephone network provides personalized communication services based on subscriber prescribed double speech signal processing of utterances of both calling and answering parties on a subscriber line having multiple subscribers with a single directory number. Specifically, when one of the multiple subscribers has personalized voice mail service and a busy/no answer call is received, the network uses speech processing of an utterance of the calling party to identify a customer service profile of the called party in the terminating switch. This contains instructions inviting storage of a voice message left by the caller. Upon the subscriber going off-hook, the customer profile of the subscriber line is installed in the switch. The subscriber transmits an utterance and the personalized customer profile of the subscriber is identified by a virtual office equipment number and the profile installed in the switch. The subscriber may then retrieve the stored message.

41 Claims, 7 Drawing Sheets

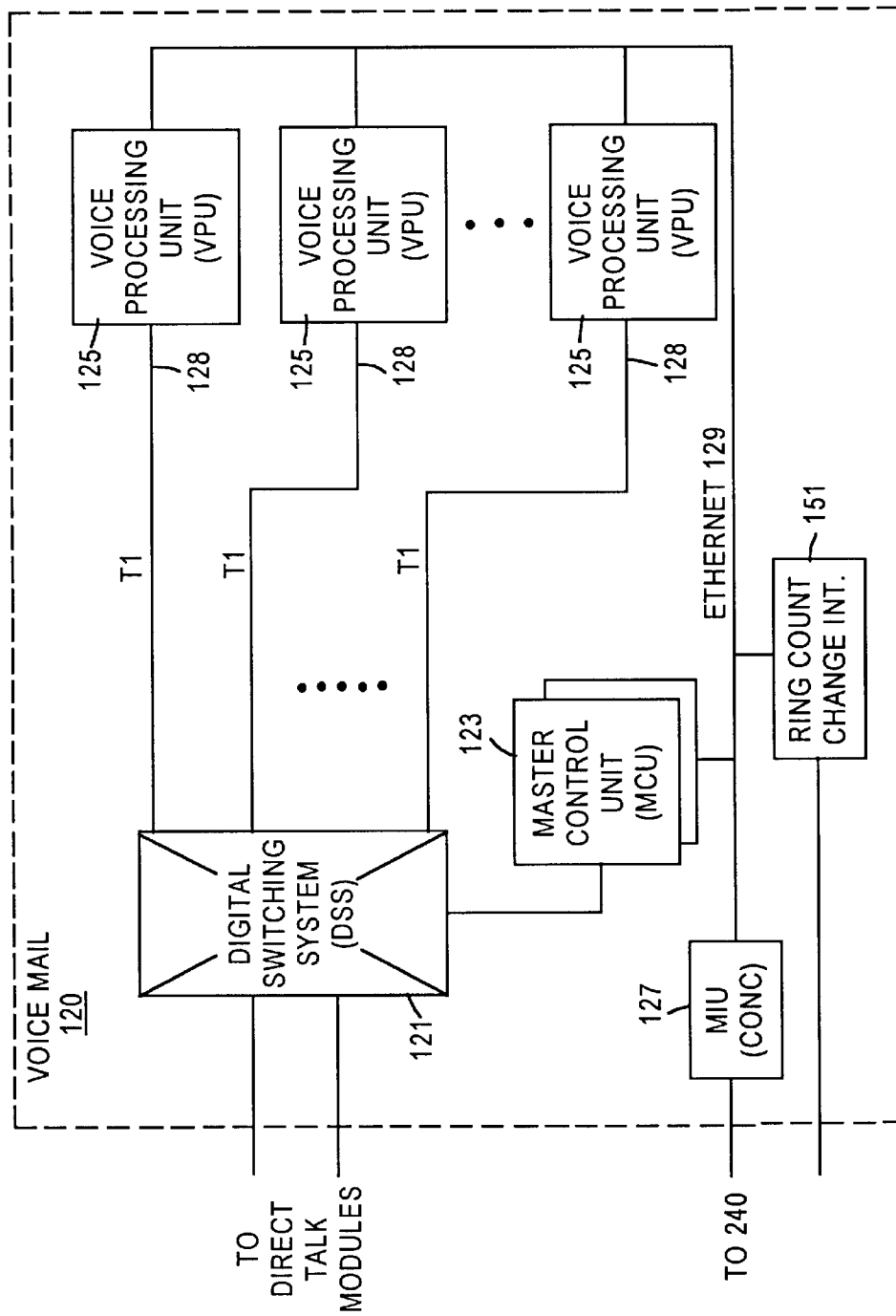

ND SERVICES
PROVIDING ENHANCED SERVICES THROUGH SIV AND PERSONAL DIAL TONE

CROSS-REFERENCE TO RELATED APPLICATIONS

This is a continunation-in-part of U.S. patent applications Ser. No. 08/828,959, filed Mar. 8, 1997, now U.S. Pat. No. 5,978,450; 08/904,936, filed Aug. 1, 1997, now U.S. Pat. No. 6,038,305; and 08/997,505, filed Dec. 23, 1997 , now U.S. Pat. No. 6,101,242 the disclosures of which are incorporated entirely by reference.

TECHNICAL FIELD

The present invention relates to personalized telecommunications service, preferably offered through an intelligent telephone network. In particular, the present invention relates to the identification of one or both calling and answering speakers to control processing of the communication. Enhanced services are provided on a personalized basis to multiple subscribers using the same line to terminal equipment.

Acronyms

The written description uses a large number of acronyms to refer to various services, messages and system components. Although generally known, use of several of these acronyms is not strictly standardized in the art. For purposes of this discussion, acronyms therefore will be defined as follows:
Address Complete Message (ACM)
Advanced Intelligent Network (AIN)
ANswer Message (ANM)
Automatic Number Identification (ANI)
Call Processing Record (CPR)
Central Office (CO)
Common Channel Interoffice Signalling (CCIS)
Data and Reporting System (DRS)
Destination Point Code (DPC)
Generic Data Interface (GDI)
Initial Address Message (IAM)
Integrated Service Control Point (ISCP)
Integrated Services Digital Network (ISDN)
ISDN User Part (ISDN-UP)
Intelligent Peripheral (IP)
Line Identification Data Base (LIDB)
Multi-Services Application Platform (MSAP)
Office Equipment (OE)
Origination Point Code (OPC)
Personal Communications Service (PCS)
Plain Old Telephone Service (POTS)
Point in Call (PIC)
Personal Identification Number (PIN)
Primary Rate Interface (PRI)
Public Switched Telephone Network (PSTN)
Service Control Point (SCP)
Service Creation Environment (SCE)
Service Management System (SMS)
Service Switching Point (SSP)
Signaling System 7 (SS7)
Signaling Point (SP)
Signaling Transfer Point (STP)
Simplified Message Desk Interface (SMDI)
Speaker Identification/Verification (SIV)
Terminating Attempt Trigger (TAT)
Time Slot Interchange (TSI)
Traffic Service Position System (TSPS)
Transaction Capabilities Applications Part (TCAP)
Transmission Control Protocol/Internet Protocol (TCP/IP)

BACKGROUND ART

Today the public switched telephone network (PSTN) and other telephone networks such as cellular systems provide most telephone services based on number identification of the telephone set or line that each party uses. Services are personalized only to the extent that a party uses the same line and/or instrument. For example, a person typically has one set of service features and billing options available via a telephone on the person's desk at the office, another set of service features and billing options available via the telephone line to their home and perhaps a third set of service features and billing options available via a wireless telephone (e.g. cellular or personal communications service (PCS)). The networks process calls to and from each of these different subscriber telephones based on a separate telephone number. Also, a caller may use personalized billing options by using a calling card, but often the input operations for calling card service are overly complex. With the exception of calling card billing, each person using a particular telephone typically can only access those service features and billing options associated with the particular line or telephone instrument.

The proliferation of services causes subscribers inconvenience. For example, circumstances arise in which a subscriber may want a feature or billing option normally associated with one line or instrument, such as the office telephone, when they are in fact using a different line or instrument such as their home or PCS telephone. Alternatively, two or more persons using one telephone or line often want different sets of service options. Also, the extreme increase in demand for telephone services is rapidly exhausting the capacity of the network, particularly in terms of the telephone numbers available under the current numbering plan.

A number of specific solutions have been proposed for individual problems, such as work at home and/or transfer of service to new locations) as an individual travels. However, each of these solutions is limited or creates its own new problems.

For example, U.S. Pat. No. 4,313,035 to Jordan et al. discloses a method of using an intelligent network to provide a 'follow-me' type service through multiple exchanges of the switched telephone network using an AIN type of telephone system architecture. Each subscriber to the locator service has a unique person locator telephone number. To access the system to update data in a service control database, the subscriber dials 0700 and his unique person locator telephone number. The telephone switching office routes the call to a traffic service position system (TSPS) which prompts the caller (e.g. provides an additional dial tone) and receives further digits from the subscriber. The subscriber inputs a three digit access code, indicating the type of update call, and a four digit personal identification number. If calling from the remote station to which the subscriber wishes his calls routed, the local switching office forwards the line identification number of that station to the TSPS. The TSPS forwards the dialed information and the line identification to the data base for updating the particular subscriber's location record. A caller wishing to reach the subscriber dials the subscriber's unique person locator number. A telephone switching office sends the dialed number to the central database. The database retrieves the stored completion number for the called subscriber and forwards that number back to the switching office to complete the call.

The Jordan et al. approach allows calls to follow the subscriber to each new location, but the subscriber must have a unique telephone number for this service. Each station that receives a call also must have a unique telephone number. As such, the Jordan et al. approach actually exacerbates the shortage of telephone numbers. Also, Jordan et al. rely on subscriber input of identification numbers. Subscribers often find this inconvenient, and this technique is often prone to number entry errors.

U.S. Pat. No. 4,899,373 to Lee et al. discloses a system for providing special telephone services to a customer on a personal basis, when the customer is away from his or her home base or office. The personalized services are provided in a multiple exchange office environment, using a central database for feature control. The nationally accessible central database system stores feature data in association with personal identification numbers. A subscriber wishing to use his personalized features while away from home base dials a special code and presents the personal identification number. The exchange transmits a query to the central database, and the corresponding feature data is retrieved from the database. The database forwards the feature data to the exchange, and the exchange stores the received feature data in association with the station from which the request was initiated. Subsequently, the exchange accesses the downloaded feature data to provide telephone service corresponding to the subscriber's personalized telephone features via the station the subscriber is currently operating from. A temporary office arrangement may be established in which the personalized features will be immediately available on incoming and outgoing calls for a period of time specified by the subscriber.

U.S. Pat. No. 5,206,899 to Gupta et al. pertains to a system wherein a subscriber can assign desired characteristics to any "target station" which is an active telephone accessible to a telecommunications network. A call thereafter that originates from the target station can use customized features, such as account code dialing and corporate billing arrangements. Initially, a service profile is created and stored for each subscriber and contains information describing desired features and billing options. The characteristics of a particular target station are changed by an activation process that can be initiated from any location. Automatic number identification (ANI) information associated with the target station is entered into an ANI trigger table in an intelligent switch, and the service profile is loaded into a database. When a call originates from the target station, information in the database is applied to the switch to provide the desired characteristics. An example of one of the features is when an employee of company X wishes to make business related calls from his/her telephone, the call has the characteristics of a call made from the office by a special billing arrangement.

Like Jordan, the Lee et al. and Gupta et al. systems depend on a dialed number entry by the subscriber to activate the service. Also, the Lee et al. and Gupta et al. systems do not provide a simple manner for more than one subscriber to obtain personalized service over the same telephone line. In Lee et al., during the period when the switch stores the roaming subscriber's profile in association with the line, all calls are processed based on that one profile. Similarly, in Gupta et al., while the ANI trigger is set against the line, all outgoing calls cause database access and use of the subscriber's profile in the database. There is no way to fall back on the normal profile for that line unless and until the service for the roaming subscriber is cancelled with respect to that one line.

U.S. Pat. No. 5,247,571 to Kay et al. discloses an Area Wide Centrex service provided by an advanced intelligent telephone network. The service provides centrex features, such as extension dialing, to multiple locations. The Kay et al. Patent also suggests a Work-at-Home feature. This feature allows the home telephone line to selectively operate as a residential line or as a Centrex business line, on a call-by-call basis. For a business call, the user would preface each call with an access indicator to identify a business call. When an outgoing call from the home line lacks the access indicator, the network processes the call as a standard residential call.

The Work-at-Home feature in the Kay et al. system requires only dialing of a code before each outgoing business call. However, the Kay et al. approach requires that the business profile is stored in association with the home line before the subscriber makes the call. The subscriber can use the Centrex billing and service features from the business account only from a home telephone previously associated with the business line. The subscriber can not use the billing and service features from the business account from any randomly selected telephone. Also, from the home line, a person can either use the normal residential profile service or the pre-defined business profile service. There is insufficient flexibility to enable a wider range of services for multiple subscribers through the one line.

U.S. Pat. No. 5,422,936 to Douglas J. Atwell, issued Jun. 6, 1995, describes an Enhanced Message Service Indication. For a number of years, telephone companies have been providing a service which assigned two or more directory numbers per line and corresponding distinctive ringing signals. One of the telephone switch vendors refers to this feature as "Multiple Directory Numbers per Line" or "MDNL." This patent provides a system for providing voice mail service in a MDNL situation. The system is effective in serving its intended purpose but assumes the assignment of one directory or telephone number for each subscriber or service. As previously stated the current demand for telephone services is rapidly exhausting the capacity of the network, particularly in view of the telephone numbers available under the current numbering plan.

An increasingly popular telephone services is caller identification or 'caller ID'. The telephone network identifies the telephone number associated with the line or instrument used by the calling party and supplies the number and or the name to a display device at the called customer's premises.

Subscribers having ISDN service receive caller ID data, for display at the time of an incoming call, in the form of a data message which the end office switch transmits over the D-channel. For analog telephone customers, however, existing caller ID utilizes in-band transmission technology similar to that described in U.S. Pat. Nos. 4,582,956 and 4,551,581 to Doughty. In such a system, the end office switch connected to the called party's line transmits directory number data for the calling party's telephone line as frequency shift keyed (FSK) data inserted in the silent interval between ringing signal pulses applied to the called party's line. The receiving apparatus includes a line interface unit, a converter, a control circuit and a display unit. A frequency shift keyed (FSK) signal representing the special service information is filtered from the ringing signals by the line interface unit. The converter detects the FSK signal and demodulates the special service information from the FSK signal. Following detection of the FSK signal, the control circuit receives and stores the special service information. The stored information is periodically sent to the display unit to begin exhibiting thereof during the silent interval before the next ringing signal.

The local telephone exchange carriers have recently begun offering an enhanced form of caller ID, sometimes referred to as 'Caller ID Deluxe' service. This enhanced service utilizes AIN type call processing to access a Line Information Database (LIDB) to translate the calling party's directory number into name data. The end office switch forwards the name data and the normal caller ID telephone number as FSK encoded data inserted in the silent intervals between ringing signals.

The LIDB database includes a single listing for each telephone line and translates each number into a single name, typically the name of the party identified as the customer or subscriber for billing purposes. In fact, the LIDB database provides this single translation even for calls from one line having multiple telephone numbers. Consider an example in which a family has one line with two numbers and a distinctive ringing service. The first number is used for the family as a whole, and the second number is used for a teenage son or daughter. The distinctive ringing allows people in the household to know whether or not each call is for the teenager. On outgoing calls, however, the end office switch always identifies the line by the primary number (the family's number), and the LIDB database always provides the name of the billing subscriber, e.g. the father's name. As a result, when the teenager calls a friend, the friend will receive the main number and possibly the father's name. If the friend calls back using the information from his caller ID display terminal, the friend calls the family's main number, not the teenager's number.

Also, the above discussed examples of prior suggestions to customize services have not adapted the caller identification to correspond to the actual party using the telephone on the outgoing call. For example, in a system like that of Lee, Gupta or Kay, the caller might use features and billing options associated with her personalized or work service, but any such calls would produce a caller ID display identifying the number of the station from which she originated the call. If the called party subscribed to the name type enhanced caller ID, the network would provide a name associated with that telephone number, not the name of the actual calling party.

U.S. Pat. Nos. 4,961,217 and 4,759,056 disclose a card based system for providing personalized features, including caller name display. Each user has a "portable memory device" in the form of an identification card bearing personal information including identification information. When initiating a call, the user inserts the card in the calling station, and information from the card is transmitted to the central switching system. In one embodiment, the switching system translates the identification information from the card to produce a textual representation of the calling party's name and transmits that information to a called terminal for display. Although this system does provide a name display identifying the actual called party, the system requires the use of the identification card and specialized calling terminals for reading the information from the cards.

Another enhanced service which has become extremely popular is so called Voice Mail service. Voice mail is a service which may be considered a custom calling service and normally includes in its operation the use of call forwarding. Voice mail has become commonplace not only in business usage but also on an individual telephone service subscriber basis through Centrex service from a central office. A voice mail system is a specialized computer that stores messages in digital form on a fixed disk. The voice is generally digitized, usually at a much slower rate than the 64 Kb/s signal the central office uses in its switching network. The digitized voice is compressed and stored on a hard disk that maintains the voice mail operating system, system prompts, and greetings, and the messages themselves. A processor controls the compressing, storing, retrieving, forwarding and purging of files. A form of early systems is described in Matthews et al. U.S. Pat. No. 4,371,752 (hereinafter the Matthews '752 Patent), issued in February, 1983, and several related patents. U.S. Pat. No. 4,585,906 (hereinafter the Matthews '906 Patent), issued Apr. 29, 1986 to Gordon H. Matthews et al. The Matthews '906 Patent is a continuation-in-part of the Matthews '752 Patent. U.S. Pat. No. 4,602,129 (hereinafter the Matthews '129 Patent), issued Jul. 22, 1986 to Gordon H. Matthews et al. The Matthews '129 Patent is a continuation-in-part of the '752 Matthews Patent.

The three Matthews Patents each describe a voice mailbox type system using digital storage and programmed control to offer a wide variety of message storage, forwarding and delivery type services.

U.S. Pat. No. 4,625,081, issued Nov. 25, 1986, to Lawrence A. Lotito, et al. This patent describes an automated telephone voice service system which provides automatic recording and editing of voice messages as well as forwarding of recorded voice messages to other accounts and telephone numbers with or without operator assistance.

In all of the foregoing systems voice mail is provided to a single subscriber premises line or, as in the Atwell Patent, to a single subscriber number. A need still exists for an effective and user friendly system for providing personalized calling service features, including actual subscriber identification for voice mail purposes. In particular a need exists for a system for providing personalized features which would facilitate a degree of call control permitting the accomplishment of new functions, including enhanced voice mail and voice mail notification, and which would improve the handling of functions which are now subject to being accomplished only in cumbersome and inconvenient fashions.

DISCLOSURE OF THE INVENTION

The present invention addresses the above noted problems and provides advances over the existing technology by personalizing telecommunication services based on a speech authenticated identification of the not only of the actual subscriber but also of the speakers at both ends of the communication. Offices of a communication network utilize profile data associated with identified persons, rather than profile data associated with a particular telephone number or a particular communication link. In many of the preferred service applications, the network uses a virtual office equipment number assigned to a speaker's profile data to retrieve the data for providing a specific service, reducing or eliminating the need for assignment of additional telephone numbers. The network also provides responding party identification information which is used to determine at least a portion of the processing of the particular call.

Thus, in one aspect the present invention relates to a method of providing service through a communication network. A request to make a call from a predetermined link through the network is detected. The next step in the method is receiving and processing speech signals from a person via the predetermined link. The processing identifies the person making the call as one of a number of subscribers or persons designated as users of services offered through the communication network. An instruction is sent to a switching office of the network instructing that office to utilize profile data corresponding to the identified subscriber or user for processing of the call. Preferably the profile data is selected at least partially through the use of a virtual office equipment number. This method includes identifying one party to a requested communication service, for example the party making an outgoing call, as one of a plurality of subscribers or designated users. Using a virtual office equipment number, assigned to the identified one user, corresponding profile data is retrieved from storage. A communication network provides the requested communication service over a communication link, based at least in part on the retrieved profile data. As part of the service, a portion of the retrieved profile data is used to direct processing which provides identification of a person responding to the call over another link of the communication network.

Other aspects of the invention relate to a communication network implementing the personalized services, including dual caller and responder specific identification. The system and methodology comprehended by the invention is applicable to both outgoing as well as incoming calls. The preferred implementation of the communication network is an intelligent implementation of a public switched telephone network. The preferred network includes a number of central office switches interconnected by trunk circuits and servicing a substantial number of telephone links. The intelligent network also includes a service control point storing a database of records used in controlling services provided through the central offices. A first signaling network carries signaling messages between the offices as well as signaling messages between the offices and the service control point. A multifunction intelligent peripheral is provided and also may exchange signaling information with the service control point, preferably over a second signaling network.

Another aspect of the invention relates to an improved central office switching system capable of processing a call using profile information selected in response to a virtual equipment number. An office equipment number is 'virtual' where it is assigned to an individual subscriber, instead of to specific network equipment such as a line termination or a specific station.

The switching system includes interface modules coupled to the communication links and a switch providing selective communication connections between the interface modules. An administrative module controls connections provided by the switch. The administrative module includes mass storage containing subscriber profiles, a processor for providing control instructions to the switch, and a signaling interface for signaling communication with at least one external network node. In response to a virtual office equipment number received via the signaling interface, e.g. from a separate peripheral platform as discussed above, the processor retrieves a subscriber profile corresponding to the virtual office equipment number from the mass storage. The processor uses the retrieved profile to process a selective connection through the switch between two of the interface modules.

Advantages of the personal dial tone service should be readily apparent to those skilled in the telecommunications art. For example, in the shared line application, several subscribers can share a single line or communication link as well as a single telephone number. Outgoing call features, however, are personalized to each subscriber. For example, the network can provide each user a different level of service which, according to a preferred embodiment of the invention, may impose restrictions on that user. In addition, the network may direct the performance of a variety of functions both within and without the network. These functions preferably include the identification of the second party to the communication, and the specific nature of the functions are at least in part determined by that identification. The service uses speech based identification.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

The drawing figures depict the present invention by way of example, not by way of limitations. In the figures, like reference numerals refer to the same or similar elements.

FIG. 6 is a block diagram depicting an example of one voice mail system suitable for use pursuant to one preferred embodiment of the invention.

BEST MODE FOR CARRYING OUT THE INVENTION

In response to each of several types of service requests, the personalized service of the present invention initially identifies the individual subscriber or user, preferably using a speaker identification/verification procedure. The system then retrieves profile information corresponding to the identified subscriber or user. The communication network processes one or more calls to or from an identified communication link using the individual user's profile data. On an outgoing telephone call from the subscriber or user, for example, the service request may be an off-hook signal, and the network may provide 'dial-tone' type telephone services based on the retrieved profile information. In this example, the network may provide a dial tone signal or a customized prompt and then permit the caller to out-dial a call. Caller identification, calling features and/or additional identification of the responding party functions apply based on the profile information. The network also provides personalized services on incoming calls based on the identity of the calling party and on data contained in the individual profile of the answering user.

The personalized service may utilize a variety of different networks. For example, the service may be adaptable to Internet based voice communications. The preferred embodiments utilize various implementations of modern telephone networks. To understand the invention, it may be helpful first to consider the architecture and operation of an advanced intelligent network (AIN) type implementation of a public switched telephone network.

Figure 1:
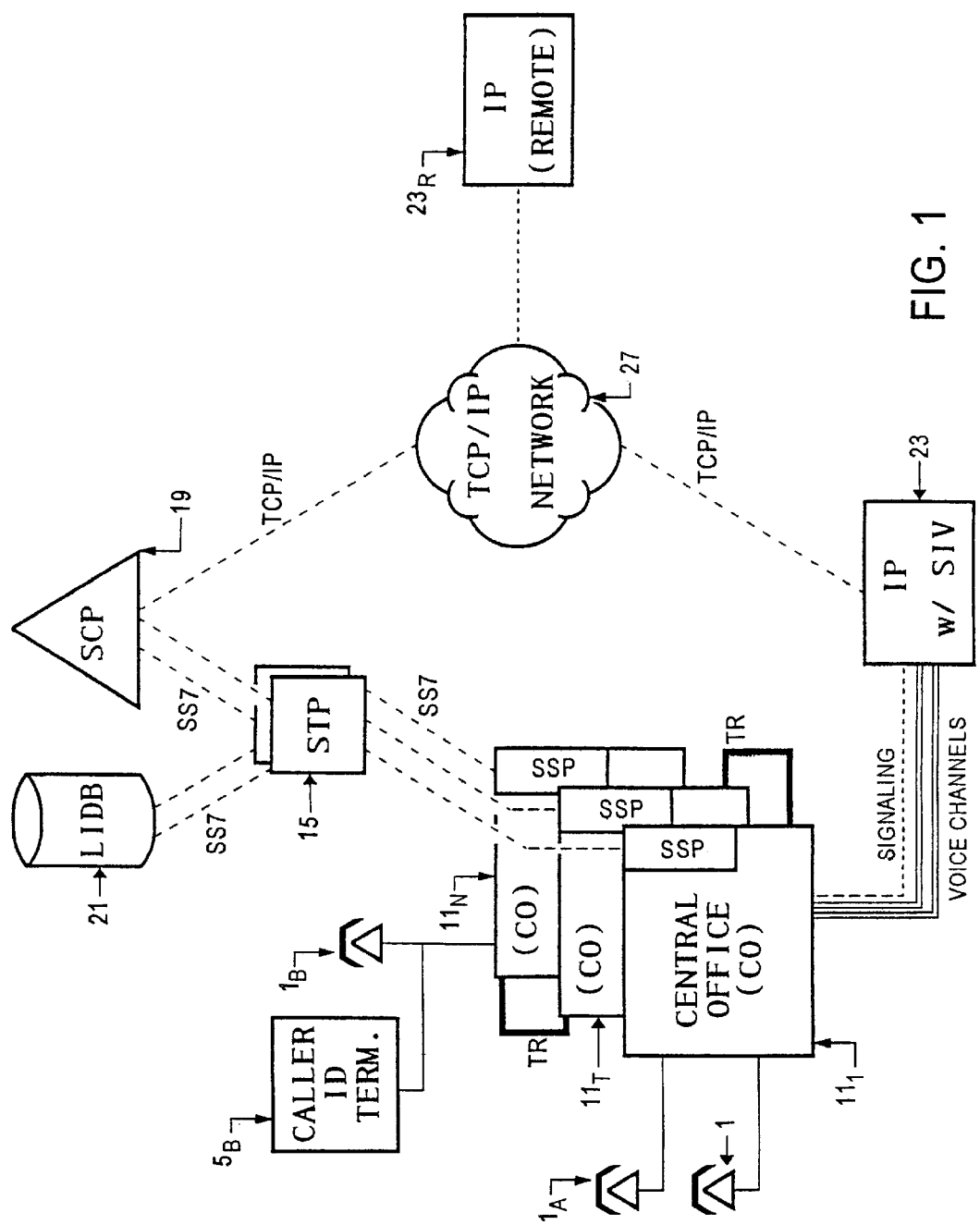
FIG. 1 is a simplified block diagram of an intelligent telephone network that may be used to offer the personalized service of the present invention.

FIG. 1 provides a simplified illustration of the preferred intelligent telephone network for implementing the personal dial tone service in accord with the present invention. As shown, the telephone network includes a switched traffic network and a common channel signaling network carrying the control signaling messages for the switched telephone traffic network. In this implementation, the system further includes a secondary signaling network.

The telephone or traffic network (operated by a combination of local carriers and interexchange carriers) includes a number of end office and tandem office type central office switching systems 11. FIG. 1 shows a number of subscriber stations, depicted as telephones 1, connected to a series of central office switches $11_1$ to $11_N$. In the preferred implementation, the connections to the central office switches 11 utilize telephone lines, and the switches are telephone type switches for providing landline communication. However, it should be recognized that other communication links and other types of switches could be used. Trunk circuits TR carry communication traffic between the central office switches 11.

Each end office type central office switch, such as $11_1$ and $11_N$, provides switched telephone connections to and from local communication lines or other subscriber links coupled to end users stations or telephone sets 1. For example, the central office $11_1$ serves as an end office to provide switched telephone connections to and from local communication lines coupled to end users telephone station sets, such as telephone $1_A$, whereas the central office $11_N$ serves as an end office to provide switched telephone connections to and from local communication lines coupled to end users telephone station sets, such as telephone $1_B$.

The typical telephone network also includes one or more tandem switching offices such as office $11_T$, providing trunk connections between end offices. As such, the traffic network consists of local communication links and a series of switching offices interconnected by voice grade trunks, only two examples of which are shown at TR in FIG. 1. One set of trunks TR might interconnect the first end office $11_1$ to the tandem office $11_T$, whereas another set of trunks TR might interconnect the tandem office $11_T$ to another end office $11_N$. Other trunks might directly connect end offices. Although not shown, many offices serve as both end offices and tandem offices for providing different call connections.

FIG. 1 shows connections to the stations 1 via lines, and typically these links are telephone lines (e.g. POTS or ISDN). It will be apparent to those skilled in the art, however, that these links may be other types of communication links, such as wireless links. At least some of the stations have caller ID capability. If the line is an ISDN line, the station may incorporate a display for visually presenting the caller ID information and other signaling related messages. If the link is a typical analog telephone line, the customer premises equipment includes a caller ID terminal, one example of which is shown at $5_B$. The terminal $5_B$ displays at least telephone numbers and preferably displays alphanumeric information to enable displays of callers names.

Although shown as telephones in FIG. 1, the terminal devices or stations 1 can comprise any communication device compatible with the local communication link. Where the link is a standard voice grade telephone line, for example, the terminals could include facsimile devices, modems etc. The processing in accord with the invention, however, relies on identification of the subscriber, preferably by voice based recognition. For this purpose, the terminals preferably include two-way voice communication elements.

The lines and trunks through the central offices 11 carry the communication traffic of the telephone network. The preferred telephone network, however, also includes a common channel interoffice signaling (CCIS) network carrying a variety of signaling messages, principally relating to control of processing of calls through the traffic portion of the network. The CCIS network includes packet data links (shown as dotted lines) connected to appropriately equipped central office switching systems such as offices 11 and a plurality of packet switches, termed Signaling Transfer Points (STPs) 15. To provide redundancy and thus a high degree of reliability, the STPs 15 typically are implemented as mated pairs of STPs. The CCIS network of the telephone system operates in accord with an accepted signaling protocol standard, preferably Signaling System 7 (SS7).

In the preferred embodiment shown in FIG. 1, each central office 11 has at least minimal SS7 signaling capability, which is conventionally referred to as a signaling point (SP) in reference to the SS7 network. As such, the offices can exchanges messages relating to call set-up and tear-down, typically in ISDN-UP format. At least some, and preferably all, of the central office switches 11 are programmed to recognize identified events or points in call (PICs) as advanced intelligent network (AIN) type service triggers. In response to a PIC or trigger, a central office 11 initiates a query through the CCIS signaling network to a control node to either a Service Control Point (SCP) 19 or to a database system, such as a Line Identification Database (LIDB) 21. The SCP 19 provides instructions relating to AIN type services. The LIDB 21 provides subscriber account related information, for calling card billing services or for subscriber name display purposes in an enhanced caller ID application. Those central office switching systems having full AIN trigger and query capability for communication with the SCP and/or the LIDB are referred to as Service Switching Points (SSPs).

The central office switches 11 typically consist of programmable digital switches with CCIS communications capabilities. One example of such a switch is a 5ESS type switch manufactured by AT&T; but other vendors, such as Northern Telecom and Seimens, manufacture comparable digital switches which could serve as the SSPs and SPs. The SSP type implementation of such switches differs from the SP type implementation of such switches in that the SSP switch includes additional software to recognize the full set of AIN triggers and launch appropriate queries. A specific example of an SSP capable switch is discussed in detail later, with regard to FIG. 2.

One key feature of the present invention is that the program controlled switch accepts instructions to load profiles and/or receives profiles over a signaling link. In most cases, these profiles are identified by virtual office equipment numbers. The profiles include a range of information relating to subscribers services, such as service features, classes of service, individual billing options, and according to a preferred feature of the invention, information relating to restrictions applied to individual users, as well as the performance of functions related to that user.

The above described data signalling network between the SSP type central offices 11 and the SCP 19 is preferred, but other signalling networks could be used. For example, instead of the packet switched type links through one or more STP's, a number of central office switches, an SCP and any other signaling nodes could be linked for data communication by a token ring network. Also, the SSP capability may not always be available at the local office level, and several other implementations might be used to provide the requisite SSP capability. For example, none of the end office switches may have SSP functionality. Instead, each end office would connect through a trunk to a tandem office which has the SSP capability. The SSP tandem then communicates with the SCP via an SS7 type CCIS link, as in the implementation described above. The SSP capable tandem switches are digital switches, such as the 5ESS switch from AT&T; and the non-SSP type end offices might be 1A analog type switches.

The SCP 19 may be a general purpose computer storing a database of call processing information. In the preferred implementation, the SCP 19 actually is an Integrated Service Control Point (ISCP) developed by Bell Atlantic and Bell Communications Research. The ISCP is an integrated system. Among other system components, the ISCP includes a Service Management System (SMS), a Data and Reporting System (DRS) and the actual database also referred to as a Service Control Point (SCP). In this implementation, the SCP maintains a Multi-Services Application Platform (MSAP) database which contains call processing records (CPRs) for processing of calls to and from various subscribers. The ISCP also typically includes a terminal subsystem referred to as a Service Creation Environment or SCE for programming the MSAP database in the SCP for the services subscribed to by each individual customer.

The components of the ISCP are connected by an internal, high-speed data network, such as a token ring network. The internal data network also typically connects to a number of interfaces for communication with external data systems, e.g. for provisioning and maintenance. In the preferred embodiment, one of these interfaces provides communications to and from the SCP 19 via a packet switched data network, such as the TCP/IP network 27.

The SCP may be implemented in a variety of other ways. The SCP may be a general purpose computer running a database application and may be associated with one of the switches. Another alternative is to implement a database of CPRs or the like within an STP (see e.g. Farris et al. U.S. Pat. No. 5,586,177).

The LIDB database 21 is a general purpose computer system having a signalling link interface or connection to a pair of STPs 15. The computer runs a database program to maintain a database of information relating to customer accounts and identifications. For example, a subscriber's entry in the LIDB database might include the subscriber's telephone number, a personal identification number for credit card billing purposes, and the subscriber's name and address.

The preferred telephone network also includes one or more intelligent peripherals (IPs) 23 to provide enhanced announcement and digit collection capabilities and speech recognition. The IP 23 is essentially similar to that disclosed in commonly assigned U.S. U.S. Pat. No. 5,572,583 to Wheeler, Jr. et al. entitled "Advanced Intelligent Network with Intelligent Peripherals Interfaced to the Integrated Services Control Point," and the disclosure of the network and operation of the IP disclosed from that Patent is incorporated herein in its entirety by reference.

The IP 23 may connect to one or more central offices 11. The connections transport both communication traffic and signaling. The connection between a central office 11 and the IP 23 may use a combination of a T1 and a Simplified Message Desk Interface (SMDI) link, but preferably this connection utilizes a primary rate interface (PRI) type ISDN link. Each such connection provides digital transport for a number of two-way voice grade type telephone communications and a channel transporting signaling data messages in both directions between the switch and the IP.

As discussed more later, there are certain circumstances in which the SCP 19 communicates with the IP 23. These communications could utilize an 1129 protocol and go through an SSP type central office 11 and the SS7 network. However, in the preferred embodiment of FIG. 1, the IP 23 and the SCP 19 communicate with each other via a separate second signaling network 27. These communications through network 27 between the IP and the SCP may utilize an 1129+ protocol or a generic data interface (GDI) protocol as discussed in the above incorporated Patent to Wheeler, Jr. et al.

The IP 23 can provide a wide range of call processing functions, such as message playback and digit collection. In the preferred system, the IP also performs speaker identification/verification (SIV) on audio signals received from users. Specifically, the IP 23 used for the personalized service includes a voice authentication module to perform the necessary speaker identification/verification function. The IP 23 also includes storage for subscriber specific template or voice feature information, for use in identifying and authenticating subscribers based on speech.

In the simplest form, the IP 23 serving a subscriber's local area stores the templates and performs the speaker identification/verification. However, in a system serving a large geographic area and providing personal dial tone to a large, roaming subscriber base, the templates may be transferred between SCP/IP pairs, to allow an IP near a subscriber's current location to perform the speaker identification/verification on a particular call. For example, if a remote IP $23_R$ required a template for a subscriber from the region served by the IP 23, the remote IP $23_R$ would transmit a template request message through the network 27 to the IP 23. The IP 23 would transmit the requested template back through the network 27 to the remote IP $23_R$.

In a network such as shown in FIG. 1, routing typically is based on dialed digit information, profile information regarding the link or station used by the calling party and profile information regarding a line or station in some way associated with the dialed digits. Each exchange is identified by one or more three digit codes. Each such code corresponds to the NXX digits of an NXX-XXXX (seven digit) telephone number or the three digits following the area code digits (NPA) in a ten-digit telephone number. The telephone company also assigns a telephone number to each subscriber line connected to each switch. The assigned telephone number includes the area code and exchange code for the serving central office and four unique digits.

Central office switches utilize office equipment (OE) numbers to identify specific equipment such as physical links or circuit connections. For example, a subscriber's line might terminate on a pair of terminals on the main distribution frame of a switch 11. The switch identifies the terminals, and therefore the particular line, by an OE number assigned to that terminal pair. For a variety of reasons, the operating company may assign different telephone numbers to the one line at the same or different times. For example, a local carrier may change the telephone number because a subscriber sells a house and a new subscriber moves in and receives a new number. However, the OE number for the terminals and thus the line itself remains the same.

On a normal call, an end office type switch will detect an off-hook condition on the line and provide dial tone. The switch identifies the line by its OE number. The office also retrieves profile information corresponding to the OE number and off-hook line. If needed, the profile identifies the currently assigned telephone number. The switch in the end office receives dialed digits and routes the call. The switch may route the call to another line serviced by that switch, or the switch may route the call over trunks and possibly through one or more tandem offices to an office that serves the called party's station or line. The switch terminating a call to a destination will also utilize profile information relating to the destination, for example to forward the call if appropriate, to apply distinctive ringing, etc.

AIN call processing involves a query and response procedure between an SSP capable switching office 11 and a database system, such as the SCP 19. The SSP capable switching offices initiate such processing upon detection of triggering events. At some point during processing of a telephone call, a central office switching system 11 will recognize an event in call processing as a 'Point in Call' (PIC) which triggers a query to the SCP 19. Ultimately, the SCP 19 will return an instruction to the switching system 11 to continue call processing. This type of AIN call processing can utilize a variety of different types of triggers to cause the SSPs 11 to initiate the query and response signaling procedures with the SCP 19. In the presently preferred embodiments discussed below, the personal dial tone service utilizes an off-hook immediate trigger, a dialed number trigger and a terminating attempt trigger (TAT), to facilitate different aspects of the service.

In accord with one aspect of the present invention, before providing dial-tone service, the SSP central office 11 that is serving an outgoing call extends the call to the IP 23 providing the speaker identification/verification (SIV) functionality. In the preferred embodiments, this operation involves AIN type call routing to the IP. The IP 23 prompts the caller and collects identifying information, preferably in the form of speech. The IP analyzes the caller's input to identify the caller as a particular subscriber. If successful, the IP signals the SSP to load profile data for that subscriber into the register assigned to the call in the call store. In most of the preferred service applications, the IP disconnects, and the SSP central office 11 processes the call in accord with the loaded profile information. For example, the central office 11 may now provide actual dial tone or provide a message prompting the caller to dial a destination number. The caller dials digits, and the central office processes the digits to provide the desired outgoing call service, in the normal manner. The IP may stay on the line, to monitor speech and thus caller identity, for some service applications.

The call processing by the central office switch 11 utilizes the loaded subscriber profile information. For example, the profile data may indicate specific procedures for billing the call to this subscriber on some account not specifically linked to the originating telephone station or line. For example, in a college dormitory, the billing information might specify billing of a student's calls to the account of the student's parent(s). Any call restrictions, imposed at the wish of the parents, would be reflected in the profile. The switch would restrict the calling services accordingly, e.g. to limit distance, cumulative cost and/or duration of calls. The dormitory example is to be regarded as merely illustrative of the varied situations to which the system and methodology of the invention is applicable, as will become apparent from following detailed description.

The inventors also envision use of selected subscriber profile information on incoming calls. When a serving central office SSP 11 detects a call to a line having the personalized service, processing hits a terminating attempt trigger (TAT). The SSP interacts with the SCP 19 and routes the call to the IP 23. The IP 23 prompts the caller to identify a desired called party, e.g. one of the students sharing the dormitory line. Menu announcement together with either digit collection or preferably speech recognition processing by the IP 23 facilitates identification of the desired called party from those associated with the line. Based on identification of the called subscriber, the IP 23 signals the SSP switch 11 to load profile data for that subscriber into the register assigned to the call in the call store. In this case, however, the switch 11 uses selectively loaded profile information for terminating the call. The IP disconnects, and the SSP central office 11 processes the call in accord with the loaded profile information.

For example, the central office 11 may provide a distinctive ringing signal corresponding to the identified subscriber. This service enables distinctive ringing for multiple subscribers on one line without assigning each subscriber a separate telephone number. The loaded profile information may specify call forwarding in event of a busy or no-answer condition. This enables routing of the call to the identified subscriber's mailbox, or another alternate destination selected by the subscriber, even though the call did not utilize a unique telephone number uniquely assigned to the called subscriber.

It is a feature of one preferred embodiment of the invention that the menu utilized on an incoming call also includes a so-called 'challenge' wherein the caller is requested to speak his or her name. The profile of the called user which has been installed in response to identification of the user may contain limitations applicable to identified callers. To this end the speech recognition node, preferably the IP, is provided with a previously obtained template to permit identification of such callers. As later described in further detail, the identification of both the called and calling party may entail maintaining a voice connection to the IP. Such a connection may be utilized for either recording the conversation and/or bridging a third party onto the call, such as a parent or other supervisory authority.

The present invention also encompasses a procedure in which a subscriber calls in from a line not specifically designated for personal dial tone service. The network routes the call to the IP 23, and the IP identifies the subscriber and the line from which the subscriber called-in. The subscriber can interact with the IP 23 to have her personal dial tone service associated with that line, either for one call or for some selected period of time. The IP 23 instructs the appropriate central office switch(es) 11 to load profile data associated with the subscriber.

The IP 23 might instruct the end office switch to load the profile data only in the assigned call store register. The switch would use the profile data only for a single call, for example to bill a call from a pay-phone or a hotel room telephone to the subscriber's home account. Alternatively, the IP 23 might instruct the central office 11 serving the line to the calling station 1 to utilize a virtual office equipment number (OE) and associated profile data for calls to and from that line for some period of time. In this later example, the IP 23 would also instruct the central office 11 serving the line to the subscriber's home station 1 to modify the subscriber's profile to forward calls for the subscriber's telephone number. The modified profile data in the home office 11 would result in forwarding of the subscriber's incoming calls through the office 11 to the selected station 1, for the set period of time.

The present invention relies on the programmable functionality of the central office switches and the enhanced call processing functionalities offered by the IPs. To understand these various functionalities, it may be helpful to review the structure and operation of a program controlled central office and one implementation of an IP. Subsequent description will explain several of the above outlined call processing examples in greater detail.

Figure 2:
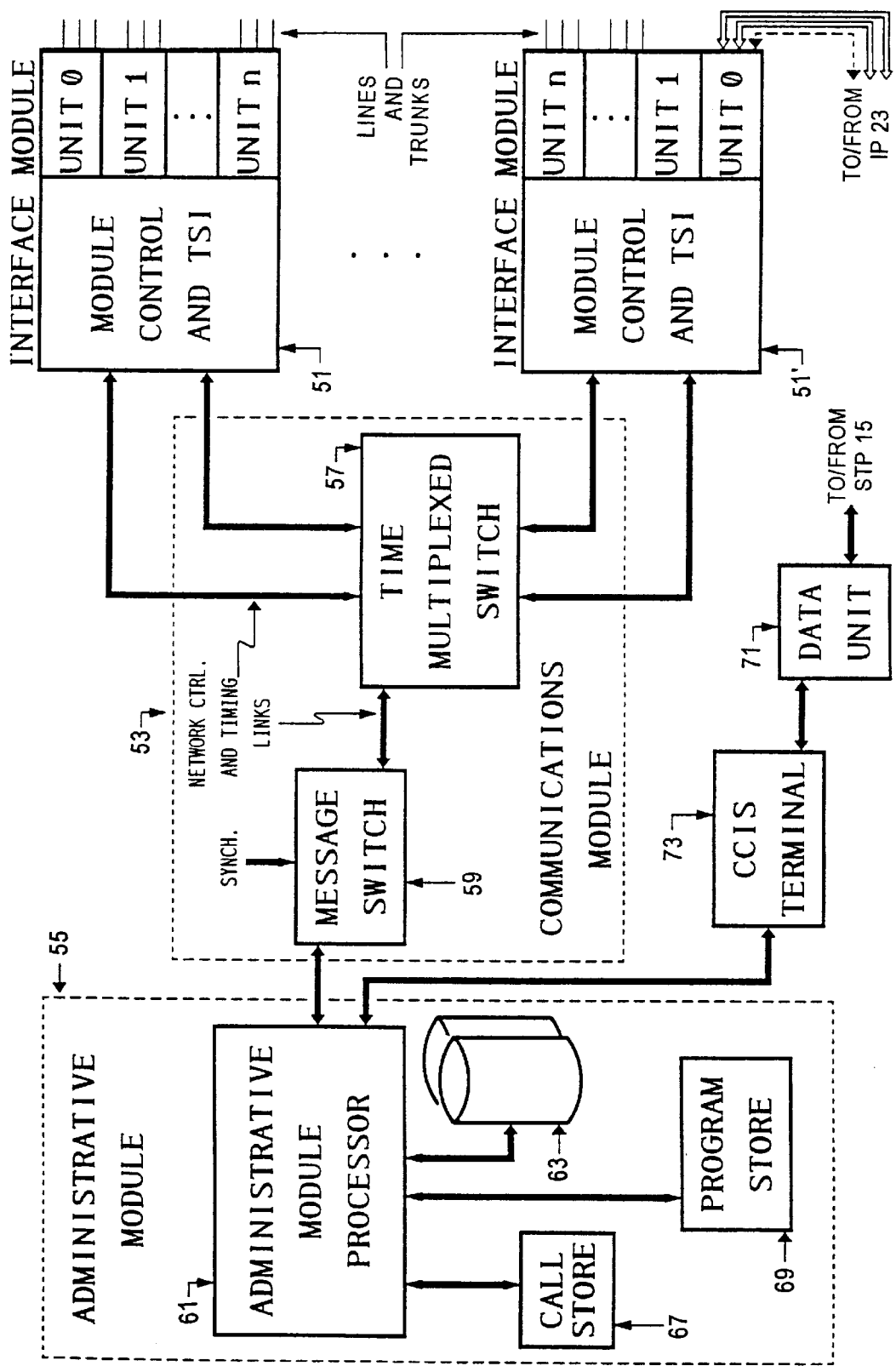
FIG. 2 is a simplified block diagram illustrating the significant functional components of an SSP type central office switching system used in the network of FIG. 1.

FIG. 2 is a simplified block diagram of an electronic program controlled switch which may be used as any one of the SSP type central offices 11 in the system of FIG. 1. As illustrated, the switch includes a number of different types of modules. In particular, the illustrated switch includes interface modules 51 (only two of which are shown), a communications module 53 and an administrative module 55.

The interface modules 51 each include a number of interface units 0 to n. The interface units terminate lines from subscribers' stations, trunks, T1 carrier facilities, etc. Each such termination is identified by an OE number. Where the interfaced circuit is analog, for example a subscriber loop, the interface unit will provide analog to digital conversion and digital to analog conversion. Alternatively, the lines or trunks may use digital protocols such as T1 or ISDN. Each interface module 51 also includes a digital service unit (not shown) which is used to generate call progress tones and receive and detect dialed digits in pulse code or dual-tone multifrequency form.

In the illustrated embodiment, the unit 0 of the interface module 51' provides an interface for the signaling and communication links to the IP 23. In this implementation, the links preferably consist of one or more ISDN PRI circuits each of which carries 23 bearer (B) channels for communication traffic and one data (D) channel for signaling data.

Each interface module 51 includes, in addition to the noted interface units, a duplex microprocessor based module controller and a duplex time slot interchange, referred to as a TSI in the drawing. Digital words representative of voice information are transferred in two directions between interface units via the time slot interchange (intramodule call connections) or transmitted in two directions through the network control and timing links to the time multiplexed switch 57 and thence to another interface module (intermodule call connection).

The communication module 53 includes the time multiplexed switch 57 and a message switch 59. The time multiplexed switch 57 provides time division transfer of digital voice data packets between voice channels of the interface modules 51 and transfers signaling data messages between the interface modules. The switch 57 together with the TSIs of the interface modules form the overall switch fabric for selectively connecting the interface units in call connections.

The message switch 59 interfaces the administrative module 55 to the time multiplexed switch 57, so as to provide a route through the time multiplexed switch permitting two-way transfer of control related messages between the interface modules 51 and the administrative module 55. In addition, the message switch 59 terminates special data links, for example a link for receiving a synchronization carrier used to maintain digital synchronism.

The administrative module 55 provides high level control of all call processing operations of the switch 11. The administrative module 55 includes an administrative module processor 61, which is a computer equipped with disc storage 63, for overall control of CO operations. The administrative module processor 61 communicates with the interface modules 51 through the communication module 53. The administrative module 55 may include one or more input/output processors (not shown) providing interfaces to terminal devices for technicians and data links to operations systems for traffic, billing, maintenance data, etc.

A CCIS terminal 73 and an associated data unit 71 provide an SS7 signalling link between the administrative module processor 61 and one of the STPs 15 (see FIG. 1). Although only one such link is shown, preferably there are a plurality of such links providing redundant connections to both STPs of a mated pair and providing sufficient capacity to carry all necessary signaling to and from the particular office 11. The SS7 signaling through the terminal 73, the data unit 71 and the STPs provides two-way signaling data transport for call set-up related messages to and from other offices. These call set-up related messages typically utilize the ISDN-UP (ISDN-users part) protocol portion of SS7. The SS7 signaling through the terminal 73, the data unit 71 and the STPs also provides two-way signaling data transport for communications between the office 11 and database systems or the like, such as the SCP 19. The communications between the office 11 and the database systems or the like utilize the TCAP (transactions capabilities applications part) protocol portion of SS7.

As illustrated in FIG. 2, the administrative module 55 also includes a call store 67 and a program store 69. Although shown as separate elements for convenience, these are typically implemented as memory elements within the computer serving as the administrative module processor 61. The program store 69 stores program instructions which direct operations of the computer serving as the administrative module processor 61.

For each call in progress, a register assigned within the call store 67 stores translation and user profile information retrieved from disc storage 63 together with routing information and any temporary information needed for processing the call. For example, for a residential customer initiating a call, the call store 67 would receive and store line identification and outgoing call billing information corresponding to an off-hook line initiating a call. For the personal dial-tone service, the assigned register in the call store 67 will receive and store different profile data depending on the particular subscriber associated with any given call. A register in the call store is assigned and receives profile data from the disc memory both for originating subscribers on outgoing calls and for terminating subscribers on incoming calls.

Figure 3:
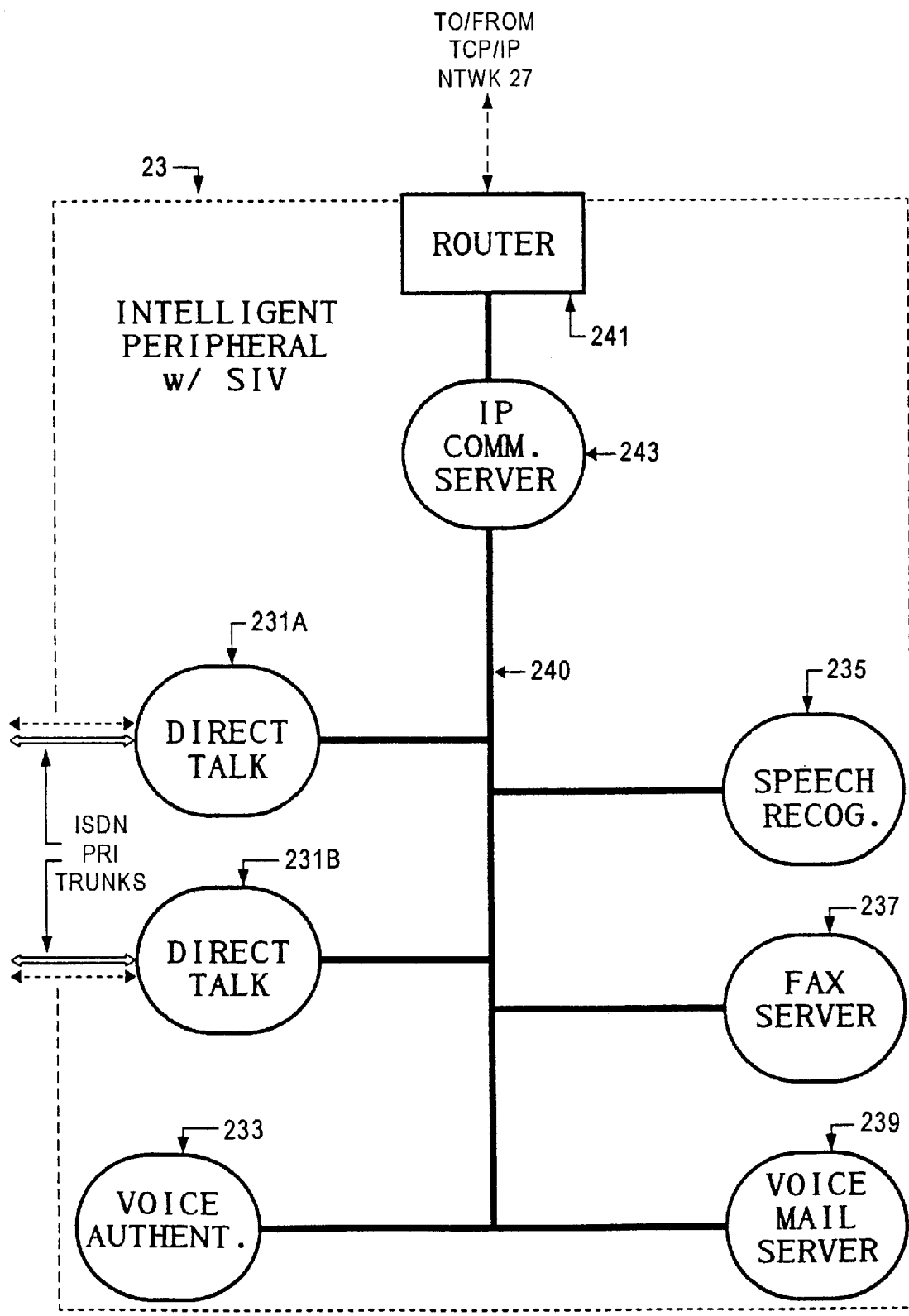
FIG. 3 is a simplified block diagram illustrating the significant functional components of an Intelligent Peripheral (IP) used in the network of FIG. 1.

A variety of adjunct processor systems known in the telephone industry can be used as the IP 23. The critical requirements are that the IP system process multiple calls and perform the subscriber identification functions, preferably by speaker identification and authentication. FIG. 3 is a functional diagram illustration of an IP 23 for performing the subscriber identification functions, possibly by dialed digit input and preferably by analysis and recognition of speech.

The preferred IP architecture utilizes separate modules for different types of services or functions, for example, one or two Direct Talk type voice server modules 231A, 231B for interfacing ISDN PRI trunks to the SSP central office(s) 11. Separate modules 233, 235 perform voice authentication and speech recognition. The IP 23 includes a variety of additional modules for specific types of services, such as a server module 237 for fax mail, and another server 239 for voice mail services. The various modules communicate with one another via an internal data communication system or bus 240, which may be an Ethernet type local area network.

Each Direct Talk module 231A or 231B comprises a general purpose computer, such as an IBM RS-6000, having digital voice processing cards for sending and receiving speech and other audio frequency signals, such as IBM D-talk 600 cards. Each voice processing card connects to a voice server card which provides the actual interface to T1 or primary rate interface ISDN trunks to the switching office. In the PRI implementation, the Direct Talk computer also includes a signaling card, providing two-way signaling communication over the D-channel of the PRI link. Each Direct Talk computer also includes an interface card for providing two-way communications over the internal data communications system 240.

The voice processing cards in the Direct Talk modules 231A, 231B provide voice message transmission and dialed digit collection capabilities. The modules 231A, 231B also perform the necessary line interface functions for communications to and from those servers which do not incorporate actual line interfaces. For example, for facsimile mail, a Direct Talk module 231 connected to a call would demodulate incoming data and convert the data to a digital format compatible with the internal data communication network 240. The data would then be transferred over network 240 to the fax server 237. For outgoing facsimile transmission, the server 237 would transfer the data to one of the Direct Talk modules over the network 240. The Direct Talk module 231 would reformat and/or modulate the data as appropriate for transmission over the ISDN link to the switch 11.

The Direct Talk modules provide a similar interface function for the other servers, such as the voice mail server 239, the speech recognition module 235 and the voice authentication module 233. For incoming speech signals, the Direct Talk module connected to a call receives digital speech signals in the standard pulse code modulation format carried on a B-channel of an ISDN link. The Direct Talk module reformats the speech data and transmits that data over the internal network 240 to the server or module performing the appropriate function, for example to the authentication module 233 for analysis and comparison of features to stored templates or feature data for known subscribers.

In the outgoing direction, the currently connected Direct Talk module may play an announcement from memory, e.g. to prompt a caller to say their name. Alternatively, the Direct Talk module may receive digitized speech over the network 240 from one of the other modules, such as a stored message retrieved from voice mail server 239. The Direct Talk module reformats the speech signal as needed for transmission over the ISDN B-channel to the caller.

The illustrated IP also includes a communication server 243. The communication server 243 connects between the data communication system 240 and a router 241, which provides communications access to the TCP/IP network 27 that serves as the second signaling communication system. The communication server 243 controls communications between the modules within the IP 23 and the second signaling communication system. The server 243 and the router 241 facilitate communication between the elements of the IP 23 and the SCP 19. The IP may also use this communication system to communicate with other IP's, for example to send subscriber voice template information to the remote IP $23_R$ (FIG. 1) or to receive such information from that IP or some other network node.

The personalized service relies on the voice authentication module 233 to perform the necessary speaker identification/verification function. For the identification and authentication of subscribers or users, the voice authentication module 233 within the IP 23 stores a template or other feature or voice pattern information for each person who has the personalized service in the area that the IP services. For example, if the subscriber utilizes the personal dial tone service from a particular line, such as a shared line in a dormitory or the like, the IP stores the subscriber's voice pattern information in a file associated with the office equipment (OE) number of the particular line. If the IP 23 serving a call does not store the template or feature data for a particular subscriber, the IP 23 may obtain subscriber identification by dialed digit input and then obtain a copy of the template or feature data from a remote IP $23_R$ via communication through the TCP/IP network 27, in order to authenticate the subscriber's identity.

Using current technology, a new subscriber or user would get on line with the IP serving that subscriber and 'train' that IP by speaking certain phrases. From the received audio signals representing those phrases, the IP would store templates or other pattern information for use in identifying and/or verifying that a caller is the particular subscriber.

During actual call processing, the voice authentication module 233 receives speech information from the caller. The voice authentication module 233 compares the received information to its stored template or feature data to identify a calling party as a particular subscriber.

In the case of speech recognition applied to incoming calls, the IP is trained in a different manner. Current speech recognition technology permits recognition with a reasonable degree of certitude based on training from a limited sample of recorded speech of a subject. In situations where the target of the speech recognition is not such as may participate in the cooperative manner of subscribers, recorded samples of prior telephone speech may be used with available recognition facilities of a more sophisticated nature.

In such situations the present invention also relies on the speech recognition capability of the module 235, particularly in processing of incoming calls in certain situations. The speech recognition module 235 enables the IP to analyze incoming audio information to recognize vocabulary words. The IP 23 interprets the spoken words and phrases to determine subsequent action. For example, the IP might recognize the caller speaking the name of a called subscriber and use the subscriber identification to instruct the terminating central office to control the call in accord with that subscriber's profile.

The preferred routing of the calls in accord with the invention utilizes AIN type call processing. To understand the call processing, it may be helpful to consider several specific examples in more detail.

In a first example, consider an outgoing call from the station $1_A$ to the station $1_B$. Assume per call assignment of profile data to the originating line, for personal dial tone service on each outgoing call. FIG. 4 provides a simplified flow diagram of the signal flow and processing for such an outgoing call.

Assume use of a standard telephone for purposes of this example. The person lifts the handset creating an off-hook state in the telephone $1_A$, and a corresponding signal or change in state on the line to the central office 11 (step S1). In this call flow, the off-hook signal is a type of service request, i.e. a request to make an outgoing call. The serving central office $11_1$ detects the off-hook and commences its call processing. Specifically, the central office assigns a register in the call store 67 to this call and loads profile information associated with the off-hook line from the disc storage 63 into the assigned register. In this case, the central office $11_1$ is an SSP capable office, and the loaded profile data indicates an off-hook immediate trigger set against the particular line. The serving SSP type office $11_1$ therefore detects this off-hook PIC as an AIN trigger (step S2).

In response to the off-hook and the off-hook trigger set in the subscriber's profile, the SSP type central office switch $11_1$ launches a query to the SCP 19 (step S3). Specifically, the SSP $11_1$ creates a TCAP query message containing relevant information, such as the office equipment (OE) number assigned to the off-hook line, and transmits that query over an SS7 link to one of the STPs 15. The query includes a destination point code and/or a global title translation addressing the message to the SCP 19, and the STP 15 relays the query message over the appropriate link to the SCP 19. The query from the SSP central office $11_1$ identifies the caller's line by its associated office equipment (OE) number and possibly by a single telephone number associated with the off-hook line.

In response to a query, the SCP 19 accesses its a database, typically, the MSAP database set up in the ISCP, to determine how to process the particular call. The SCP 19 identifies an access key in the query and uses the key to retrieve the appropriate record from the database. In this case, the query indicates an off-hook trigger as the trigger event, therefore the SCP 19 uses the calling party office equipment (OE) number as the access key. The SCP 19 retrieves a call processing record (CPR) corresponding to the office equipment (OE) number associated with the off-hook line and proceeds in accord with that CPR (step S4).

For the present example of the personal dial tone service, the CPR will provide information necessary for routing the call to some node of the network that will perform speaker identification/verification (SIV). In the preferred embodiment, the SIV is a function performed by an Intelligent Peripheral (IP), therefore the CPR provides information for routing the call to the nearest available IP having the SIV capability.

Based on the CPR, the SCP 19 formulates a response message instructing the SSP central office $11_1$ serving the customer to route the call. In this case, the message includes information, e.g. a office equipment (OE) number or telephone number, used for routing a call to the identified IP 23. The SCP 19 formulates a TCAP message in SS7 format, with the destination point code identifying the SSP office $11_1$. The SCP 19 transmits the TCAP response message back over the SS7 link to the STP 15, and the STP 15 in turn routes the TCAP message to the SSP central office $11_1$ (see step S5) The SSP type switch in the central office $11_1$ uses the routing information to connect the call to one of the lines or channels to the IP 23. A two-way voice grade call connection now extends between the calling station $1_A$ and the IP 23 (step S6). In the present example, the switch actually connects the off-hook line to the line to the IP before providing dial tone.

As noted above, the communication link to the IP 23 provides both line connections and signaling, preferably over a primary rate interface (PRI) type ISDN link. When the central office $11_1$ extends the call from the calling party's line to a line circuit (over a B channel) to the IP 23, the switch in that office also provides call related data over the signaling link (D channel for ISDN). The call related data, for example, includes the office equipment (OE) number normally associated with the off-hook line and possibly the telephone number for that line.

In response to the incoming call, the IP 23 will seize the line, and it will launch its own query to the SCP 19 (step S7). In the preferred network illustrated in FIG. 1, the IP 23 and the SCP 19 communicate with each other via a separate second signalling network 27, for example utilizing either an 1129+ protocol or a generic data interface (GDI) protocol as discussed in U.S. Pat. No. 5,572,583 to Wheeler, Jr. et al. The query from the IP 23 again identifies the caller's line by at least its associated office equipment (OE) number.

In response to the query from the IP 23, the SCP 19 again accesses the appropriate CPR (step S8) and provides a responsive instruction back through the network 27 to the IP 23 (step S9). Although the IP 23 could passively monitor any speech that the user might utter, the preferred implementation utilizes a 'Challenge Phase' to prompt the user to input specific identifying information. In this case, the instruction causes the IP 23 to provide a prompt message over the connection to the caller (step S10). Here, the signal to the caller may be a standard dial tone or any other appropriate audio signal. Preferably, the instruction from the SCP 19 causes the IP 23 to provide an audio announcement prompting the caller to speak personal information. In one preferred example, in step S10 the IP plays an audio prompt message asking the caller, 'Please say your full name'. The process may ask for any appropriate identifying information.

The signal received by the IP 23 goes over the lines and through the central office switch(es) for presentation via the off-hook telephone $1_A$ to the calling party. In response, the caller will speak identifying information into their off-hook telephone, and the network will transport the audio signal to the IP 23 (step S11).

As noted above, an IP 23 can provide a wide range of call processing functions, such as message playback and digit collection. In the preferred system, the IP also performs speaker identification/verification (SIV) on the audio signal received from the off-hook telephone in step S11. When the IP 23 receives speech input information during actual call processing, for this service example, the IP analyzes the speech to extract certain characteristic information (step S12).

The IP 23 stores a template or other voice pattern information for each person who has the personalized service in the area that the IP normally services. If the IP 23 does not store the particular template or feature information it needs to process a call, the IP 23 can communicate with a remote IP 23R to obtain that information. In the present shared line example, the IP 23 will store template or feature data for each subscriber associated with the particular off-hook line.

When the IP 23 receives input speech and extracts the characteristic information during actual call processing, the IP compares the extracted speech information to stored pattern information, to identity and authenticate the particular caller. In the present example, the voice authentication module 233 in the IP 23 compares the extracted speech information to the stored template or feature data for each subscriber associated with the particular off-hook line.

In step S13, the IP 23 determines if the information extracted from the speech input matches any of the stored template data feature data for an identifiable subscriber (within some threshold level of certainty). If there is a match, the IP now knows the identity of the calling subscriber. Based on the identification of the calling subscriber, the IP 23 selects a virtual office equipment (OE) number from storage that corresponds to the subscriber.

The IP 23 formulates a D-channel signaling message containing the virtual office equipment (OE) number together with an instruction to load that OE number into the register assigned to the call in place of the OE number of the off-hook line. The IP 23 supplies the message to the SSP central office switch $11_1$ over the D-channel of the ISDN PRI link (step S14). In response, the administrative module processor 61 rewrites the OE number in the register assigned to the call using the OE number received from the IP 23.

Upon rewriting the OE number in the register, the administrative module processor 61 of central office switch $11_1$ also reloads the profile information in the register (step S15). Specifically, the administrative module processor 61 retrieves profile information associated with the virtual office equipment (OE) number from the disc storage 63 into the register. As such, the profile information in the assigned register in the call store 67 now corresponds to the identified subscriber, rather than to the off-hook line.

The profile information provides a wide range of data relating to the subscriber's services. The profile data provides necessary billing information, enabling billing from the call to this particular subscriber. The profile also defines various service features available to this subscriber on outgoing calls, such as three-way calling. The profile may define a class of calling service available to the subscriber. In the dormitory example, the caller may be allowed a set dollar amount for long distance calls per month (e.g. $50.00). The profile data will indicate the remaining amount at the time of the call and will cause the switch to interrupt service when the available amount is exhausted. Other class of service restrictions might enable long distance calls only if collect and/or only if calling one or two specified numbers (e.g. only to the parents' house). The class of service might enable only long distance calls within a region or country but not international calls.

In the presently preferred implementation, when the central office switch $11_1$ reloads the profile, the central office disconnects the link to the IP 23 and connects tone receivers to the caller's line. Optionally, the central office $11_1$ may provide a 'dial tone' or other message over the line (step S16) The caller now dials digits in the normal manner (step S17), and the switch in the central office $11_1$ loads the dialed digits into the assigned register within the call store 67. The central office $11_1$ utilizes the dialed digits and the subscriber's profile data to process the call (S18). For example, if the dialed digits represent a call within the subscriber's permitted class of service, the switch completes the call to the destination station $1_B$ using the dialed digits in the normal manner. If the profile data requires a particular billing treatment, e.g. to bill a long distance call to the subscriber, the switch makes the appropriate record and forwards the record to the exchange carrier company's accounting office equipment. In accord with another aspect of the invention, the network provides caller ID data naming the identified subscriber to the destination station.

The processing to complete the call, performed in step S18, actually involves a sequence of steps. Of particular note, some of these steps facilitate delivery of caller ID information to the destination station. The present invention involves delivering caller ID information which corresponds to the identified subscriber, preferably the subscriber's name, rather than simply the number of the line or station from which the subscriber initiates the call. Two processing methodologies are envisioned for providing this calling subscriber ID feature, one involving access to name information in a central database such as LIDB and the other relying on name data from the subscriber's profile.

Figure 4A:
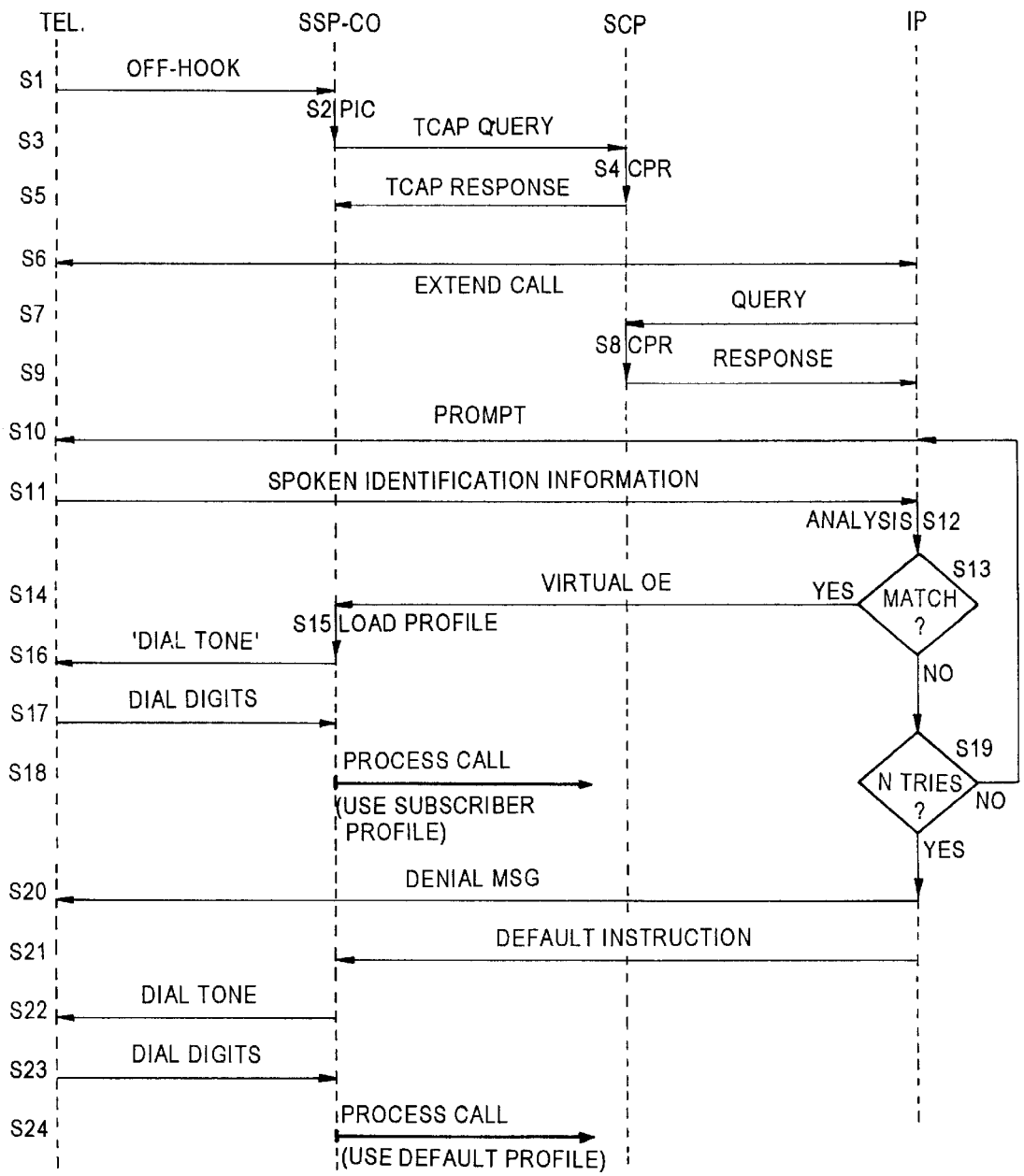
FIG. 4A is a combination signal flow and process flow diagram useful in understanding a specific example of call processing for providing an illustrative personalized service over a shared use line.
Figure 4B:
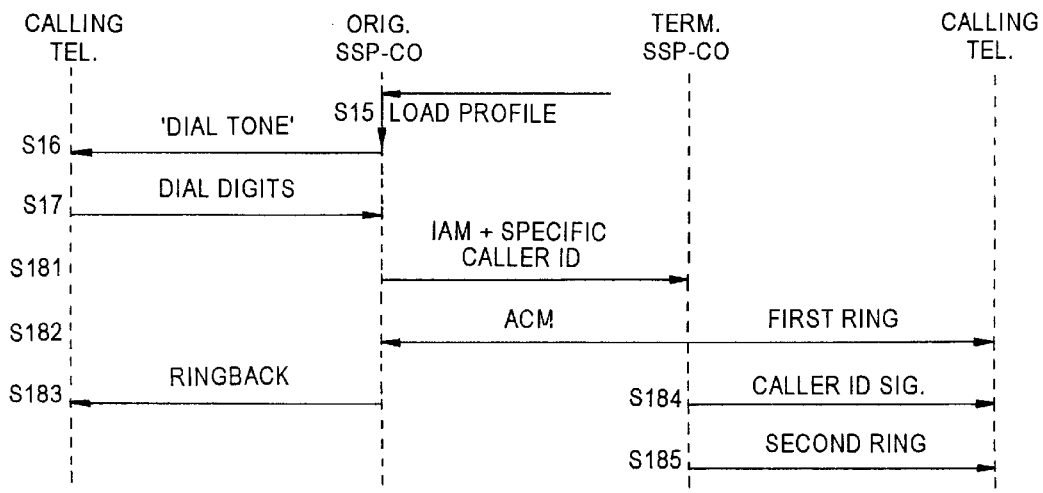
FIG. 4B is a combination signal flow and process flow diagram useful in understanding one embodiment of the processing for providing the identity of the actual caller to the destination display as caller ID information.

FIG. 4B is a simplified process and signal flow diagram, illustrating the call completion operations, including caller ID display using data from the profile. The network performs the steps depicted in FIG. 4B after identification of the subscriber, preferably based on speaker identification/verification (SIV). As discussed earlier, the IP 23 supplies the signaling message containing the virtual office equipment (OE) number and the instruction to load that OE number into the assigned register to the SSP central office switch $11_1$ over the D-channel of the ISDN PRI link (step S14). In response, the administrative module processor 61 rewrites the OE number in the register and reloads the profile information in the register (step S15).

The central office $11_1$ provides dial tone or the like over the line (step S16), the caller dials digits corresponding to the desired destination (step S17), and the switch in the central office $11_1$ begins is processing to route the call through the network. Initially, the central office $11_1$ uses the dialed number to initiate a CCIS communication with the exchange serving the intended destination, in the example the terminating central office $11_N$.

Specifically, the subscriber's serving central office $11_1$ generates an Initial Address Message (IAM) for transmission to the terminating central office $11_1$ (S181). The IAM message includes the SS7 destination point code (DPC) of the terminating central office $11_N$ and the SS7 origination point code (OPC) of the customer's serving-end central office $11_1$, for addressing purposes. The payload portion of the IAM message includes the called and calling numbers. In accord with the invention, the originating end office $11_1$ reads name data from the identified subscriber's profile, currently loaded in the assigned register, and places that data in additional field of the IAM message or in an accompanying information message addressed in the same manner as the IAM message. The originating central office transmits the IAM message and possibly an accompanying information message through the CCIS network to the distant terminating office $11_N$ (step S181).

When the terminating office $11_N$ receives the IAM message, the administrative module processor for that office retrieves the customer profile for the number in the destination number field of that message (e.g. the number for the telephone $1_B$) from its mass storage system and loads that profile into one of its call store registers. If the called party has an enhanced caller ID service, with name display, the terminating central office $11_N$ would normally recognize the attempt to complete to that party's number message as a terminating attempt trigger (TAT) type point in call (PIC) to trigger access to the LIDB database for name information. However, in this embodiment of the invention, the terminating end office detects the receipt of the subscriber's name data with the IAM message, therefore the administrative module processor in that office overrides the trigger.

The terminating central office switching system $11_N$ transmits an Address Complete Message (ACM) back to the central office $11_1$ and if the called line is available applies ringing signal to the called party's line (S182). The ACM includes a variety of information, including a calling party status indicator, e.g. line free or busy. If the line is not busy, the end office 13 rings the station Y corresponding to the dialed digits 703-333-5678, and generates the appropriate indicator in the Address Complete Message (ACM) to indicate that it received the request for a call and that the number is not busy. The ACM message is sent back by simply reversing the point codes from the IAM message. Now the destination point code (DPC) is the point code of the central office 11, and the origination point code (OPC) is the point code of the central office 13. In response to the ACM message, if the called line is available, the originating central office 11 applies a ringback tone signal to the line to the calling station $1_A$ (S183).

As part of its operations to ring the called telephone station, the terminating central office $11_N$ transmits a caller ID signal over the line. If the called party has ISDN service or the like, the switch sends a signaling message along with the ringing signal. If the called party has analog telephone service, the switch $11_N$ transmits a caller ID message (step S184) as frequency shift keyed (FSK) data inserted in the silent interval between the first ringing signal (step S182) and the second ringing signal (S185) applied to the called party's line.

In accord with the invention, the caller ID message applied to the called party's line includes the telephone number associated with the calling station $1_A$ and at least some additional data specific to the identified subscriber. If the called party has enhanced caller ID for displaying name data, the ISDN telephone or the caller ID terminal $5_B$ receives the number and the name data received with the IAM message in step S181. The caller ID terminal $5_B$ or a display device in the ISDN telephone displays the received number and name information, identifying the actual calling party, for review before the called party chooses to answer the call.

If the called party subscribes only to normal caller ID, the end office switch $11_N$ can transmit only a limited amount of information. For this purpose, the switch will select and transmit one or two characters from the subscriber identification data along with the telephone number. For example, if four persons normally call from the particular originating telephone station or line, the data sent to the terminating central office $11_N$ might include a letter or number identifying each subscriber. The switch $11_N$ would transmit that letter or number with the telephone number in the caller ID message for display.

If someone answers the telephone station $1_B$, the terminating central office switching system $11_N$ detects an off-hook condition (S13) and sends an Answer Message (ANM) back to the originating central office $11_1$ through one or more of the STPs 15. The ANM message indicates that the called telephone $1_B$ was picked up. Also, at that time the actual telephone traffic trunk circuit is connected together between the central offices $11_1$ and $11_N$. The central offices 11 connect the lines to the stations to the respective ends of the trunk circuit, to complete the voice path. At this point, actual voice communication is established between the calling station $1_A$ and the called station $1_B$. Communication continues until one or both parties hang up, at which time, all of the switched connections are torn down.

Figure 4C:
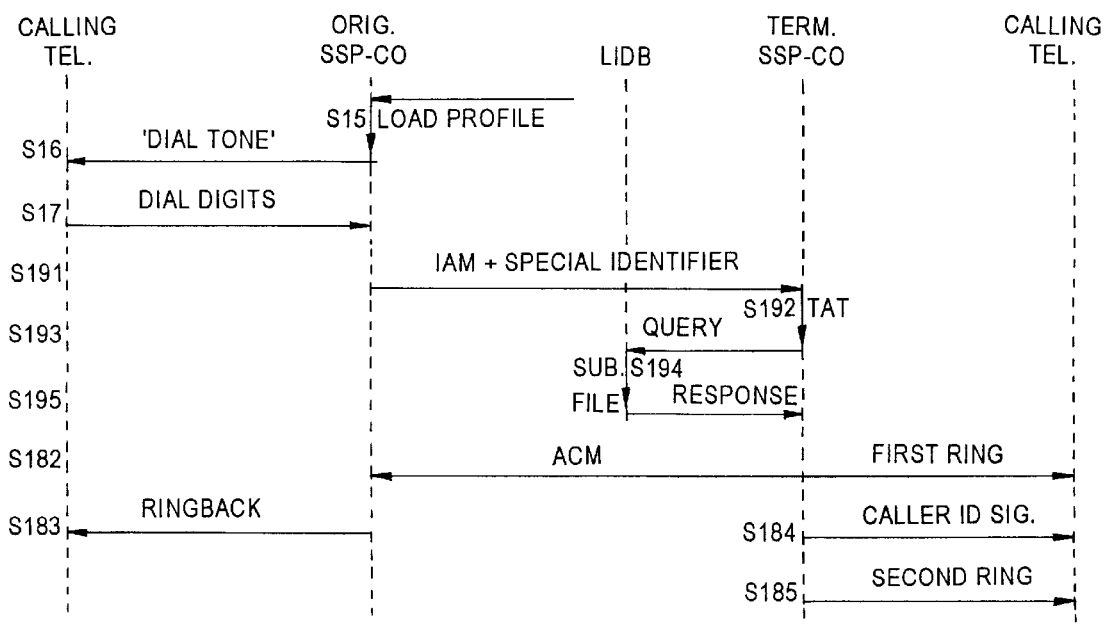
FIG. 4C is a combination signal flow and process flow diagram useful in understanding another embodiment of the processing for providing the identity of the actual caller to the destination display as caller ID information.

FIG. 4C is a simplified process and signal flow diagram, illustrating the call completion operations including, caller ID display involving access to name information in a central LIDB database. The network performs the steps depicted in FIG. 4C after identification of the subscriber, preferably based on speaker identification/verification (SIV). As in the example of FIG. 4B, the central office switch $11_1$ receives an instruction containing the subscriber's virtual office equipment (OE) number (step S14), loads the corresponding profile information in the register (step S15) and sends dial tone or the like over the line (step S16). The subscriber dials digits corresponding to the desired destination (step S17), and the switch in the central office $11_1$ transmits an IAM message through the interoffice signaling network to the terminating central office $11_N$. The information sent in or with the IAM message in step S191, however, is different than in the earlier example.

In this embodiment, the originating end office $11_1$ reads a short code identifier from the identified subscriber's profile, currently loaded in the assigned register, and places that identifier in additional field of the IAM message or in an accompanying information message addressed in the same manner as the IAM message. For example, if the network provides personal dial tone service to four identified persons associated with the originating telephone $11_1$, the short code might comprise a number from zero to three or letters such as A, B, C and D, identified by the state of two bits in the IAM or accompanying information message.

As in the earlier example, the originating end office $11_1$ addresses and transmits the IAM message with the specific subscriber identifier code through the SS7 signaling network for receipt by the terminating office $11_N$. If the called party has only normal caller ID service, then the terminating office $11_N$ would transmit a normal caller ID message to the destination, with the identifier appended to the calling party telephone number as an extra digit or character. If the called party often receives calls from this subscriber, even the limited subscriber specific identification provided by the code will enable the called party to recognize that the current call is from the identified subscriber.

FIG. 4B depicts the processing steps, beginning in step S192, for processing a call to a called customer having the enhanced caller ID service for name and number display. In such a case, when the terminating office $11_N$, the administrative module processor in that office loads the profile for the called subscriber's telephone number into a register in the call store assigned to this call. Of particular note, because the called customer has the enhanced name and number type caller ID service, the customer profile record establishes a terminating attempt trigger (TAT) against the that customer's telephone number.

At this point, the terminating office $11_N$ recognizes the called party telephone number in the destination number field of the IAM message as a terminating attempt trigger (TAT) type point in call or PIC (step S192). In response to this PIC, the terminating office $11_N$ launches a second query message through one or more of the STP(s) 15 to the LIDB database 21 (step S193). The query message includes both the telephone number associated with the calling station $1_A$ or its telephone line as well as the code identifying the specific subscriber making that call.

The LIDB database 21 uses the calling party telephone number and the code identifying the specific subscriber, received in the query, to retrieve that one subscriber's account file record from the database (step S194). The query also indicates the cause of the query, i.e. the TAT triggering event. From this information, the LIDB database recognizes that the query is a request for name information. The database 21 therefore reads up to 15 characters of name data from the subscriber's account file. The LIDB database 21 compiles a TCAP call control message including the name data and returns that call control message to the terminating central office $11_N$ via the SS7 network.

The terminating central office switching system $11_N$ receives the call control message from the LIDB database 21.

To provide the caller ID service in this embodiment, the terminating end office $11_N$ combines the name data from the call control message together with the calling party number as two caller ID messages. The end office $11_N$ then signals the originating office $11_1$ and initiates ringing of the called party's line, as discussed in more detail below.

Assuming for this discussion that the called line is available, the terminating central office switching system $11_N$ transmits an Address Complete Message (ACM) indicating availability back to the central office $11_1$ and applies ringing signal to the called party's line (step S182). In response to the ACM message, if the called line is available, the originating central office 11 applies a ringback tone signal to the line to the calling station $1_A$ (S183).

As part of its operations to ring the called telephone station, the terminating central office $11_N$ transmits a caller ID signal over the line. If the called party has ISDN service or the like, the switch sends the caller ID signaling messages along with the ringing signal. If the called party has analog telephone service, the switch $11_N$ transmits the caller ID messages sequentially over the line (step S184) as frequency shift keyed (FSK) data inserted in the silent interval between the first ringing signal (step S182) and the second ringing signal (S185) applied to the called party's line. As in the earlier example, the display provides the telephone number associated with the calling station $1_A$ as well as the name data for the specifically identified calling subscriber.

In the shared line example, each person normally expected to use the line to station $1_A$ is a different subscriber to the personal dial tone service. As the subscribers make outgoing calls, they each receive their own individualized service over the line on each separate call, in precisely the manner described above relative to steps S1 to S18 and the personal caller ID as described above relative to FIGS. 4B and 4C. For example, each subscriber may receive a different level of calling privileges and/or class of service based on their ability and/or desire to pay for telephone services. Also, the called party receives caller ID information including both the origination telephone number and the name or other identifying information associated specifically with the calling subscriber.

Returning to step S13 in FIG. 4A, the extracted information characterizing the input speech signals may not match any of the templates or feature data used by the IP 23. In this event, the process flows to step S19. The IP will count the number of tries or attempts to identify the subscriber and permit some maximum number of failed attempts (N). Assume, for example, that the software allows only two identification attempts on one call (N=2). On the first failure, the number of tries is less than N, therefore processing returns to step S10, and the IP 23 again transmits the prompt for speech input. The caller again speaks the requested input information (S11), and the authentication module 233 again analyzes the input information (S12). If the second input adequately matches a stored subscriber's information in step S13, the processing flows through steps S14 to S18 to complete the call as described above.

However, if the extracted speech information does not match a stored subscriber template or feature data, processing again flows to step S19. If the number of tries now corresponds to the limit N, for example on the second failed attempt, the processing branches to step S20. The IP 23 may now transmit a message indicating denial of service, although this is optional. If provided, the message states that only a limited class of service is available in view of the problems in recognizing the caller as a known subscriber.

The IP 23 formulates a D-channel signaling message instructing the central office switch $11_1$ to process the call in accord with default conditions and transmits that instruction to the central office switch (step S21). The instruction could include a default OE number corresponding to a default profile, or the message could instruct the switch to proceed using the OE and profile data for the off-hook line itself. The IP 23 supplies the message to the SSP central office switch $11_1$ over the D-channel of the ISDN PRI link (step S21). The administrative module processor 61 resumes call processing using the appropriate default OE and profile.

In the preferred embodiment, the switch provides a normal dial tone (S22), collects dialed digits from the caller (S23) and processes the call (S24). However, the default profile provides only some limited class of service, for example only emergency 911 service or 911 service plus flat rate local calling. The default call processing provides no additional information from the profile corresponding to any particular subscriber, therefore the network processes the call as a normal call for caller ID purposes. The caller ID service will provide only the telephone number to callers having normal caller ID, and the network will access LIDB database 21 to provide name information if any associated strictly with the telephone number, essentially in the manner that the network provides such services when there is no personalized dial tone service involved.

In the above example, the network disconnected the IP 23 after identifying the subscriber and providing the subscriber's virtual OE number to the serving central office 11. For some applications of the personal dial tone service, the central office 11 would maintain a bridged connection of the IP 23 on the line, to enable the IP to monitor the call. For example, in a prisoner telephone service, each prisoner would have only limited telephone rights as specified in each prisoner's profile data. To prevent one prisoner from selling their telephone service rights to another prisoner, the IP 23 would periodically or constantly monitor the outgoing speech signals from the prison line. The voice authentication module 233 would initially identify the prisoner subscriber as discussed above, and would periodically recheck to authenticate the identity of the party using the prison line. If the voice authentication module detects some other party using the line or did not detect the identified subscriber's speech for some predefined time interval, the IP 23 would instruct the serving central office switch 11 to disconnect the call. The IP 23 may send messages to the switch or to other network elements to initiate additional action, such as profile modification to further limit a particular prisoner's telephone privileges and/or to notify prison authorities of misuse of telephone privileges.

If the called party subscribes only to normal caller ID, the end office switch $11_N$ can transmit only a limited amount of information. For this purpose, the switch will select and transmit one or two characters from the subscriber identification data along with the telephone number. For example, if four persons normally call from the particular originating telephone station or line, the data sent to the terminating central office $11_N$ might include a letter or number identifying each subscriber. The switch $11_N$ would transmit that letter or number with the telephone number in the caller ID message for display.

If someone answers the telephone station $1_B$, the terminating central office switching system $11_N$ detects an off-hook condition (S13) and sends an Answer Message (ANM) back to the originating central office $11_1$ through one or more of the STPs 15. The ANM message indicates that the called telephone $1_B$ was picked up. Also, at that time the actual telephone traffic trunk circuit is connected together between the central offices $11_1$ and $11_N$. The central offices 11 connect the lines to the stations to the respective ends of the trunk circuit, to complete the voice path. At this point, actual voice communication is established between the calling station $1_A$ and the called station $1_B$. Communication continues until one or both parties hang up, at which time, all of the switched connections are torn down.

FIG. 4C is a simplified process and signal flow diagram, illustrating the call completion operations including, caller ID display involving access to name information in a central LIDB database. The network performs the steps depicted in FIG. 4C after identification of the subscriber, preferably based on speaker identification/verification (SIV) As in the example of FIG. 4B, the central office switch $11_1$ receives an instruction containing the subscriber's virtual office equipment (OE) number (step S14), loads the corresponding profile information in the register (step S15) and sends dial tone or the like over the line (step S16). The subscriber dials digits corresponding to the desired destination (step S17), and the switch in the central office $11_1$ transmits an IAM message through the interoffice signaling network to the terminating central office $11_N$. The information sent in or with the IAM message in step S191, however, is different than in the earlier example.

In this embodiment, the originating end office $11_1$ reads a short code identifier from the identified subscriber's profile, currently loaded in the assigned register, and places that identifier in additional field of the IAM message or in an accompanying information message addressed in the same manner as the IAM message. For example, if the network provides personal dial tone service to four identified persons associated with the originating telephone $11_1$, the short code might comprise a number from zero to three or letters such as A, B, C and D, identified by the state of two bits in the IAM or accompanying information message.

As in the earlier example, the originating end office $11_1$ addresses and transmits the IAM message with the specific subscriber identifier code through the SS7 signaling network for receipt by the terminating office $11_N$. If the called party has only normal caller ID service, then the terminating office $11_N$ would transmit a normal caller ID message to the destination, with the identifier appended to the calling party telephone number as an extra digit or character. If the called party often receives calls from this subscriber, even the limited subscriber specific identification provided by the code will enable the called party to recognize that the current call is from the identified subscriber.

FIG. 4B depicts the processing steps, beginning in step S192, for processing a call to a called customer having the enhanced caller ID service for name and number display. In such a case, when the terminating office $11_N$, the administrative module processor in that office loads the profile for the called subscriber's telephone number into a register in the call store assigned to this call. Of particular note, because the called customer has the enhanced name and number type caller ID service, the customer profile record establishes a terminating attempt trigger (TAT) against the that customer's telephone number.

At this point, the terminating office $11_N$ recognizes the called party telephone number in the destination number field of the IAM message as a terminating attempt trigger (TAT) type point in call or PIC (step S192). In response to this PIC, the terminating office $11_N$ launches a second query message through one or more of the STP(s) 15 to the LIDB database 21 (step S193). The query message includes both the telephone number associated with the calling station $1_A$ or its telephone line as well as the code identifying the specific subscriber making that call.

The LIDB database 21 uses the calling party telephone number and the code identifying the specific subscriber, received in the query, to retrieve that one subscriber's account file record from the database (step S194). The query also indicates the cause of the query, i.e. the TAT triggering event. From this information, the LIDB database recognizes that the query is a request for name information. The database 21 therefore reads up to 15 characters of name data from the subscriber's account file. The LIDB database 21 compiles a TCAP call control message including the name data and returns that call control message to the terminating central office $11_N$ via the SS7 network.

The terminating central office switching system $11_N$ receives the call control message from the LIDB database 21.

To provide the caller ID service in this embodiment, the terminating end office $11_N$ combines the name data from the call control message together with the calling party number as two caller ID messages. The end office $11_N$ then signals the originating office $11_1$ and initiates ringing of the called party's line, as discussed in more detail below.

Assuming for this discussion that the called line is available, the terminating central office switching system $11_N$ transmits an Address Complete Message (ACM) indicating availability back to the central office $11_1$ and applies ringing signal to the called party's line (step S182). In response to the ACM message, if the called line is available, the originating central office 11 applies a ringback tone signal to the line to the calling station $1_A$ (S183).

As part of its operations to ring the called telephone station, the terminating central office $11_N$ transmits a caller ID signal over the line. If the called party has ISDN service or the like, the switch sends the caller ID signaling messages along with the ringing signal. If the called party has analog telephone service, the switch $11_N$ transmits the caller ID messages sequentially over the line (step S184) as frequency shift keyed (FSK) data inserted in the silent interval between the first ringing signal (step S182) and the second ringing signal (S185) applied to the called party's line. As in the earlier example, the display provides the telephone number associated with the calling station $1_A$ as well as the name data for the specifically identified calling subscriber.

In the shared line example, each person normally expected to use the line to station $1_A$ is a different subscriber to the personal dial tone service. As the subscribers make outgoing calls, they each receive their own individualized service over the line on each separate call, in precisely the manner described above relative to steps S1 to S18 and the personal caller ID as described above relative to FIGS. 4B and 4C. For example, each subscriber may receive a different level of calling privileges and/or class of service based on their ability and/or desire to pay for telephone services. Also, the called party receives caller ID information including both the origination telephone number and the name or other identifying information associated specifically with the calling subscriber.

Returning to step S13 in FIG. 4A, the extracted information characterizing the input speech signals may not match any of the templates or feature data used by the IP 23. In this event, the process flows to step S19. The IP will count the number of tries or attempts to identify the subscriber and permit some maximum number of failed attempts (N). Assume, for example, that the software allows only two identification attempts on one call (N=2). On the first failure, the number of tries is less than N, therefore processing returns to step S10, and the IP 23 again transmits the prompt for speech input. The caller again speaks the requested input information (S11), and the authentication module 233 again analyzes the input information (S12). If the second input adequately matches a stored subscriber's information in step S13, the processing flows through steps S14 to S18 to complete the call as described above.

However, if the extracted speech information does not match a stored subscriber template or feature data, processing again flows to step S19. If the number of tries now corresponds to the limit N, for example on the second failed attempt, the processing branches to step S20. The IP 23 may now transmit a message indicating denial of service, although this is optional. If provided, the message states that only a limited class of service is available in view of the problems in recognizing the caller as a known subscriber.

The IP 23 formulates a D-channel signaling message instructing the central office switch $11_1$ to process the call in accord with default conditions and transmits that instruction to the central office switch (step S21). The instruction could include a default OE number corresponding to a default profile, or the message could instruct the switch to proceed using the OE and profile data for the off-hook line itself. The IP 23 supplies the message to the SSP central office switch $11_1$ over the D-channel of the ISDN PRI link (step S21) The administrative module processor 61 resumes call processing using the appropriate default OE and profile.

In the preferred embodiment, the switch provides a normal dial tone (S22), collects dialed digits from the caller (S23) and processes the call (S24). However, the default profile provides only some limited class of service, for example only emergency 911 service or 911 service plus flat rate local calling. The default call processing provides no additional information from the profile corresponding to any particular subscriber, therefore the network processes the call as a normal call for caller ID purposes. The caller ID service will provide only the telephone number to callers having normal caller ID, and the network will access LIDB database 21 to provide name information if any associated strictly with the telephone number, essentially in the manner that the network provides such services when there is no personalized dial tone service involved.

In the above example, the network disconnected the IP 23 after identifying the subscriber and providing the subscriber's virtual OE number to the serving central office 11. For some applications of the personal dial tone service, the central office 11 would maintain a bridged connection of the IP 23 on the line, to enable the IP to monitor the call. For example, in a prisoner telephone service, each prisoner would have only limited telephone rights as specified in each prisoner's profile data. To prevent one prisoner from selling their telephone service rights to another prisoner, the IP 23 would periodically or constantly monitor the outgoing speech signals from the prison line. The voice authentication module 233 would initially identify the prisoner subscriber as discussed above, and would periodically recheck to authenticate the identity of the party using the prison line. If the voice authentication module detects some other party using the line or did not detect the identified subscriber's speech for some predefined time interval, the IP 23 would instruct the serving central office switch 11 to disconnect the call. The IP 23 may send messages to the switch or to other network elements to initiate additional action, such as profile modification to further limit a particular prisoner's telephone privileges and/or to notify prison authorities of misuse of telephone privileges.

The first detailed example discussed above related to personal dial tone service provided on a per-call basis on a shared use line. Several known subscribers might routinely use their personal dial tone service over the same line. As noted earlier, an alternate form of the personal dial tone service can be activated on a dial-up basis. Consider now an example of a dial-up activation for a single call.

Figure 5:
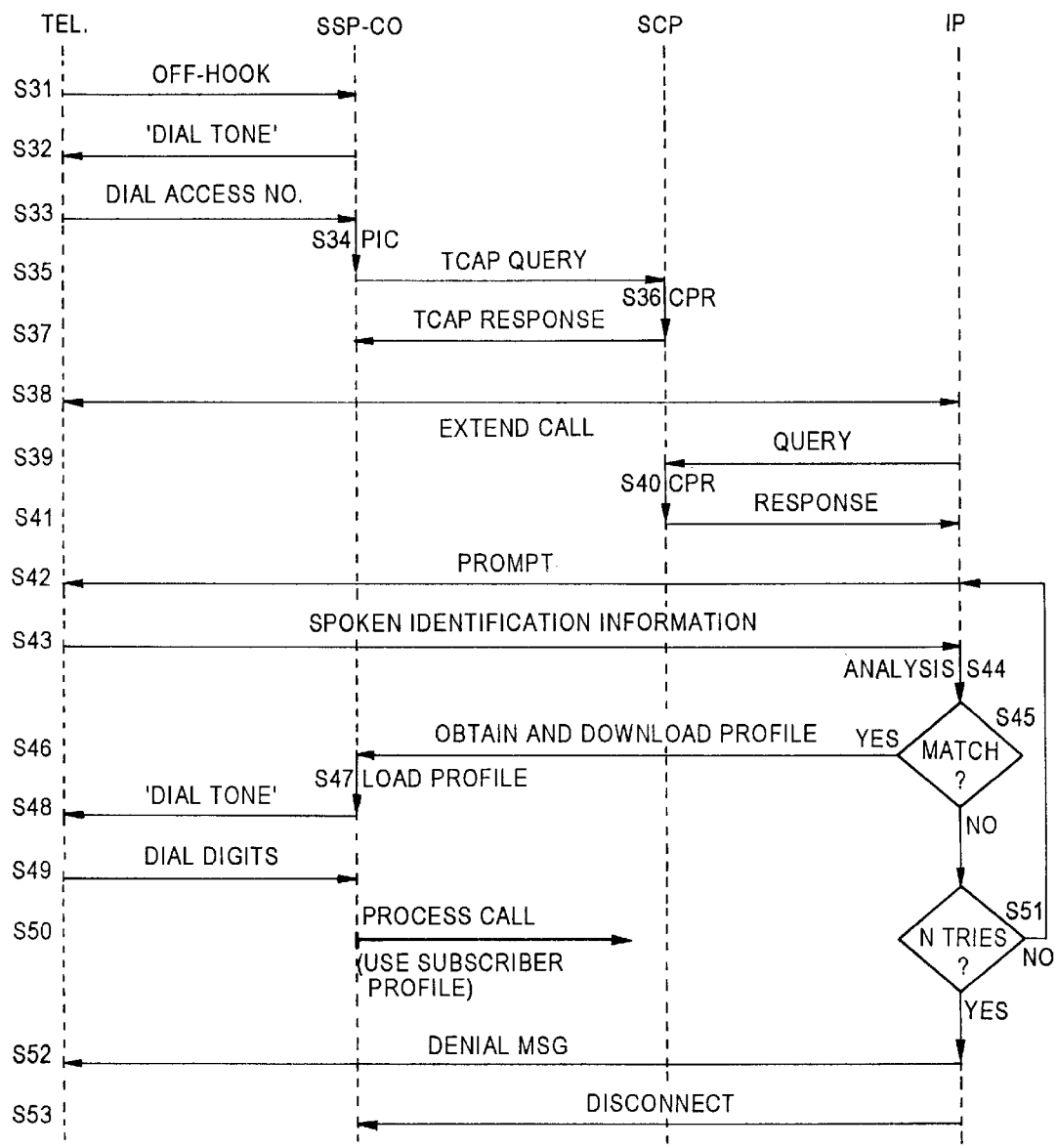
FIG. 5 is a combination signal flow and process flow diagram useful in understanding a specific example of call processing for providing an illustrative personalized service on a dial-up, per call basis.

For this example, assume that a subscriber's normal or 'home' telephone is telephone $1_B$. The end office switch $11_N$ stores the subscriber profile data for the line associated with that telephone station. Now assume that the subscriber is using station $1_A$ connected through a telephone line to central office $11_1$. FIG. 5 provides a simplified flow diagram of the signal flow and processing for such a call.

The subscriber lifts the handset creating an off-hook state in the telephone $1_A$ and a signal to office 11 (step S31). The serving central office $11_1$ detects the off-hook and commences its call processing. Specifically, the central office assigns a register in the call store 67 to this call and loads profile information associated with the off-hook line from the disc storage 63 into the register. In this case, the profile data associated with the line does not provide an off-hook trigger because the line is not specifically associated with the shared use type personal dial tone service discussed above. The central office $11_1$ therefore provides dial tone in the normal manner (step S32).

If making a normal call, the caller would dial a destination number, and the network would complete the call as dialed. To activate the personal dial tone service, however, the subscriber dials an access number assigned to that service, such as 1-800-DIALTON, from the station $1_A$ (step S33).

The dialing of an outgoing call, in this case to the access number, is another type of service request. The central office switch $11_1$ recognizes the dialed access number as a trigger event or 'PIC' (step S34). The SSP type central office $11_1$ creates a TCAP query message containing relevant information, such as the office equipment (OE) number and/or telephone number assigned to the off-hook line, the dialed number and the type of triggering event. The office $11_1$ transmits that query to the SCP 19 (step S35). Specifically, the SSP central office $11_1$ transmits the query over an SS7 link to one of the STPs 15. The query includes a point code and/or a global title translation addressing the message to the SCP 19, and the STP 15 relays the query message over the appropriate link to the SCP 19.

In response to a query, the SCP 19 accesses its database to determine how to process the particular call. In this case, the query indicates the dialed number type trigger and provides the digits of the specific number dialed. The SCP 19 uses the dialed number as the access key. The SCP 19 retrieves a call processing record (CPR) corresponding to that number associated with the personal dial tone access function (step S36). For the current exemplary access, the CPR will provide information necessary for routing the call to the IP 23 that will perform the necessary speaker identification/verification (SIV).

Based on the CPR, the SCP 19 formulates a response message instructing the SSP central office $11_1$ serving the customer to route the call. In this case, the message includes information, e.g. a office equipment (OE) number or telephone number, used for routing a call to the identified IP 23.

The SCP 19 formulates a TCAP response in SS7 format and transmits the TCAP response message back to the SSP central office 11$_1$ (see step S37).

The SSP type switch in the central office 11$_1$ uses the routing information to connect the call to a line or channel to the IP 23. A voice grade call connection now extends between the calling station 1$_A$ and the IP 23 (step S38).

The central office 11 provides a signaling message to the IP 23 with the call. In this case, the signaling message includes the dialed digits indicating a call to the personal dial tone access number. The signaling message also includes either the office equipment number or the telephone number of the line to the calling station 1$_A$.

As in the earlier example, the IP 23 will seize the line for the incoming call and launch a query to the SCP 19 through the TCP/IP network 27 (step S39). The SCP 19 accesses an appropriate CPR (S40), and based on that CPR, the SCP 19 transmits back a message (S41) instructing the IP 23 to execute a program or script for the dial-up access to the personal dial-tone service.

The IP initially plays a greeting and a prompt message (S42) and collects spoken input information (S43). The IP 23 may also play a prompt and collect digits representing the subscriber's normal or home telephone number. The voice authentication module 233 analyzes the spoken identification information to extract characteristic information (S44) and compares the extracted information to stored template or feature data to determine if there is an adequate match to the known subscriber data (S45), as in the earlier example.

In step S45, the IP 23 determines if the information extracted from the speech input matches any of the stored template data feature data for an identifiable subscriber. If there is a match, the IP now knows the identity of the calling subscriber. Based on the identity of the subscriber, the IP 23 obtains the subscriber's profile data from the central office 11$_N$ serving the subscriber's home telephone line. If the IP 23 is in direct signaling communication with the home central office 11$_N$, for example via an ISDN D-channel or an SMDI link, the IP 23 may directly request and receive the profile data over the signaling link. If the IP and the switch are not in direct communication, the IP may provide a message notifying the SCP 19, and the SCP 19 would obtain the data from the switch and provide it back to the IP 23.

The IP 23 formulates a D-channel signaling message containing the subscriber's profile information together with an instruction to load that information into the register assigned to the call in place of the profile information corresponding to the off-hook line (step S46). The IP 23 supplies the message to the SSP central office switch 11$_1$ over the D-channel of the ISDN PRI link. In response, the administrative module processor 61 rewrites the profile data in the register assigned to the call using the data from the IP 23 (step S47). As such, the profile information in the assigned register now corresponds to the identified subscriber.

When the central office switch 11$_1$ reloads the profile, the central office disconnects the link to the IP 23 and connects tone receivers to the caller's line. The central office 11$_1$ may also provide a standard dial tone or other message over the line (step S48). The caller can now dial digits in the normal manner (step S49), and the switch in the central office 11$_1$ will load the dialed digits into the assigned register within the call store 67. The central office 11$_1$ utilizes the dialed digits and the subscriber's profile data to process the call (step S50). For example, the switch in central office 11$_1$ may provide the appropriate record to bill the outgoing call to the subscriber's account. In accord with the invention, the network also provides the subscriber specific information for caller ID purposes, in the manner discussed in detail above relative to either FIG. 4B or FIG. 4C.

As in the earlier example, the preferred embodiment allows up to N tries or attempts to provide recognizable subscriber identification information. Thus, if in step S45 the extracted information characterizing the input speech signals did not match any of the templates or feature data used by the IP 23, then the process flows to step S51. If the current number of attempts for recognition on this call is less than N, processing returns to step S42, and the IP 23 again transmits the prompt for speech input. The caller again speaks the requested input information (S43), and the authentication module 233 again analyzes the input information (S44). If the second input adequately matches a stored subscriber's information S45, the processing flows through steps S46 to S50 to complete the call as described above.

However, if the extracted speech information does not match a stored subscriber template or feature data, processing again flows to step S51. If the number of tries now corresponds to the limit N, the processing branches to step S52. The IP 23 preferably transmits a message indicating denial of service (S52), and then transmits a message to the central office 11$_1$ signifying disconnection of the access call (S53). It should be noted that, in this example, normal service provided over the line to station 1$_A$ is available on a subsequent call. The failure to recognize the caller as a personal dial tone subscriber only prevents the caller from using the personal dial tone services of a subscriber to that service, for example specialized billing of calls to that subscriber's account instead of to the account normally associated with the line to the calling station 1$_A$.

In the above discussed dial-up access example, the dial tone service was personalized for a single outgoing call by temporarily loading the subscriber's profile data into the register assigned to the outgoing call in the originating central office 11$_1$. The system can provide such service to the subscriber over any line or to any telephone station, including pay telephone stations.

The present invention also enables activation of the personal dial tone service on a particular line for some predetermined period of time, for example to enable use of office or business services from some remote location while a business subscriber is out of the office. This type of operation involves an activation call requesting the service on a particular line for the desired period. Consider now an example of such a time activated service.

For this example, assume that a subscriber's normal business telephone is telephone 1$_B$. The end office switch 11$_N$ stores the subscriber profile data for the line associated with that telephone station. Now assume that the subscriber is using station 1$_A$ connected through a telephone line to central office 11$_1$ for business related communication services. The business related communication services include both incoming call related services and outgoing call related services.

To activate the personal dial tone service, the subscriber again lifts the handset at station 1$_A$, receives dial tone from the central office 11, and dials the access number assigned to that service. The network uses AIN type processing to route the call to the IP 23, as in the example discussed above relative to FIG. 5.

As in the earlier examples, the IP 23 seizes the line for the incoming call and launches a query to the SCP 19 through the TCP/IP network 27. The SCP 19 transmits back a message instructing the IP 23 to play a greeting and a prompt message and collect and analyze spoken input information to identify and authenticate the subscriber. The instruction from the SCP 19 also causes the IP 23 to prompt the subscriber and obtain input information regarding the time period for service activation and possibly to obtain digits representing the subscriber's normal business telephone number. The process of calling the access number and interacting with the IP to activate the personal dial tone service on a line for the desired period is another type of service request.

For outgoing call processing, the IP 23 signals the central office $11_1$ serving the line to station $1_A$ to set an off-hook trigger in the profile data associated with that line. The IP also obtains the profile information from the switch $11_N$ serving the station $1_B$ and provides that information together with a virtual OE number to the central office $11_1$. The office $11_1$ stores the profile in its disc memory 63 in such a manner that the switch in that office can use the virtual OE number to retrieve that subscriber's profile. For incoming calls to the subscriber, the IP 23 transmits a signaling message to the subscriber's home office $11_N$ to set a terminating attempt trigger (TAT) against the line to the subscriber's office telephone $1_B$.

The IP 23 also transmits a message through the TCP/IP network 27 to the SCP 19 advising the SCP 19 of the service activation. This message identifies the subscriber, for example by their normal telephone number and identifies the telephone number and office equipment (OE) number associated with the line to station $1_A$ that the subscriber selected for their personal dial tone service.

In response to the message from the IP 23, the SCP 19 now establishes or modifies two CPRs for this subscriber. One CPR controls processing of calls to the subscriber's normal business telephone number to enable routing to the station $1_A$, and the other controls routing of outgoing calls from that station to the IP 23 for speaker identification/verification (SIV) processing.

Subsequently, when there is an outgoing call from the station $1_A$, the network will route the call to the IP 23 to determine if the caller is the subscriber or some other party, exactly as discussed in the per-call service from a shared use line (FIG. 4). As in that earlier example, if the IP identifies the caller as the personal dial tone subscriber, then the IP 23 provides the virtual OE number to enable loading of subscriber's profile from disc memory 63. The network provides the telephone number and the subscriber specific information, for caller ID purposes, as discussed above. If the IP determines that the caller is not the personal dial tone subscriber, the IP instructs the originating office $11_1$ to simply provide dial tone and complete the call in the normal manner. The central office $11_1$ therefore will utilize the office equipment (OE) number and profile information normally associated with the line, instead of those for the personal dial tone subscriber. The network provides caller ID service, identifying the number and possibly the main name associated with the line, in the normal manner. In this way, it is quite easy for the personal dial tone subscriber and the normal subscriber to both obtain their desired services on their respective calls via the same line, and to be correctly identified to called parties who subscribe to caller ID services.

The trigger set against the subscriber's normal telephone number and establishment of the CPR in the SCP 19 enables redirection of calls normally intended for the subscriber's business telephone $1_B$ to the line to station $1_A$. Depending on how the subscriber elects to define their individual service, the network may simply route the calls to the line to station $1_A$, as a normal AIN forwarded call that simply rings the station(s) $1_A$ on the line. Alternatively, the subscriber may elect an enhanced service which involves routing to the IP, IP prompting and speech recognition to identify the called subscriber and distinctive ringing over the line, in a manner analogous to that used for processing incoming calls in shared use applications, such as the above discussed dormitory example.

As noted above, the dial-up access procedure in this latest service example required the subscriber to specify a time period that the personal dial tone service should apply to the particular line. The IP 23 stores a record of the time period elected by the subscriber. When the period expires or if the subscriber calls in earlier to change the service to another line or temporarily cancel the service, the IP 23 will provide cancellation notices to the appropriate central offices 11 and to the SCP 19. In the example, the IP 23 will notify the office $11_1$ to cancel the off-hook trigger set against the line to station $1_A$ and to delete the subscriber's virtual OE number and profile from its disc memory. The IP 23 will also instruct the central office $11_N$ to cancel the terminating attempt trigger set against the subscriber's business line to station $1_B$. The notice to the SCP 19 causes the SCP to deactivate the personal dial tone CPR and the call redirection CPR. If the associated personal identification functionality for caller ID service relies on a central database, such as LIDB, the IP would also instruct that database to temporarily establish a subscriber account record associating the subscriber's name and calling card billing information with the telephone number and a subscriber identifier code.

The subscriber can then or later interact with the IP 23 to establish time based temporary personal dial tone service through another line or location, as discussed above. In this manner, a subscriber might set up a temporary office in a motel in one city for several days. The subscriber might cancel the service while in transit to a new location. Then the subscriber might reestablish the service to set up a temporary office service at a vacation home for a week.

The time based personal dial tone service could be modified in several manners. For example, the subscriber might establish a file for use by the SCP or the IP to establish the personal dial tone service at two or more locations at specified times, e.g. at the office during office hours and at a home office during other hours. Also, the above example of this service relied on downloading the subscriber' profile into the switch serving the line with which the subscriber is temporarily associated. Alternatively, the IP could obtain the profile from the subscriber's home switch and provide the profile to the serving switch as part of the processing of each outgoing call by the subscriber from that line during the specified time period.

A preferred network implementation and a number of specific call processing routines have been discussed above by way of examples relating to the present invention. However, the preferred embodiment of the invention is amenable to a variety of modifications.

For example, the preferred embodiment described above utilizes speaker identification/verification to recognize the identity of a calling subscriber. Where such capabilities are not available, the system could use an announcement and digit collection process, for example to obtain an account number and a personal identification number (PIN).

Also, the currently preferred embodiment utilizes AIN routing to the IP and speaker identification/verification elements within the IP to identify the subscriber for profile selection. As speaker identification/verification equipment becomes more readily available, cheaper and more compact, it will be possible to build this functionality into the line cards of the end office switches. The switch itself will challenge the caller, analyze spoken information and identify the subscriber to select the appropriate profile, without routing to an IP or the like.

While the foregoing embodiments of the invention supply many outstanding needs, there still exists a need for a method of conveniently and economically coping with a number of problems which manifest themselves in one or another objecionable type of usage of the public telephone network. These may comprise usages which are either illegal or detrimental to the health, safety and security of Telco subscribers. By way of example, one problem of widespread significance is the provision of adequate protection of the security and well being of so called "latchkey children." As will be understood, this term is applied to children, usually of school age, who have working parents but who arrive home from school prior to the return of their parents.

These children admit themselves to their residence or premises and are usually instructed by their parents to keep the door locked or latched until a parent returns. In addition to these instructions parents usually admonish such children to follow parent prescribed rules in answering or using the telephone. However, experience has demonstrated that the telephone is still subject to usages which pose threats of one or another types to the children. The problem is most acute where multiple children are housed with a single telephone link to the customer premises.

Parents or guardians usually provide each child with a list of permitted calls. For example, any of the children may be permitted to call 911 in case of emergency. All of the children may be permitted to call designated relatives or friends of the family. However, the call permissions and restrictions usually vary from child to child. The older children may be allowed calls to designated schoolmates or friends. The identity of the parties to whom the children are permitted to place calls varies with the identity of the child. Conversely each child may have individually prohibited calls. In the usual situation all calls which are not expressly designated as allowed will be prohibited.

In addition to this list of permitted outgoing calls, the children are usually provided with specific instructions as to calls to be answered. However this is difficult to regulate, even in the case of obedient children. For example, the availability of a Caller ID service offers no guarantee that the indicated caller is actually on the line. The present preferred embodiment of the invention provides a system and method for supplying this need.

Following is a description to the operation of one preferred embodiment of the invention which addresses the problem of providing implementation of the instructions of the parents or guardians with a reasonable degree of certitude.

In this example it is assumed that there is a subscriber premise which houses a pair of latchkey children A and B. Child A and child B have each been provided with a list of one or more incoming calls which they are permitted to receive. Each such child (hereinafter sometimes referred to as a subscriber) is provided with a personal customer profile record which is identified by a virtual OE number. Each such profile contains data which specifies permissible and prohibited communications for the individual child. For example, each customer profile identifies the callers whose calls may be accepted.

The central office switch identifies the particular line, by the OE number assigned to that line and line number. The switch also stores and retrieves profile data which it stores for that line and number and that profile data reflects the special services to which that line and number is subscribed. When the central office detects a call to a line having the personalized service, processing hits a terminating attempt trigger (TAT). The SSP switch interacts with the SCP and routes the call to the IP. The IP prompts the caller to identify a desired called party, e.g. one of the children sharing the line. Menu announcement together with either digit collection or preferably speech recognition processing by the IP facilitates identification of the desired called child from others associated with the line. Based on identification of the called child, the IP signals the SSP switch to load profile data for that specific child into the register assigned to the call in the call store.

This substitution is accomplished. In this case, the profile for child A contains data information which indicates that child A is permitted to accept a call from child C but that child C is required to authenticate herself. The IP is apprised of this requirement and uses another prompt to the calling party to identify herself. This may be a prompt such as "Who is calling?". A template for the voice of child C is maintained in the IP. This template is now used by the IP to verify that the caller is in fact child C. Child C has now been identified and authenticated as the calling party.

The profile for child A may provide that a distinctive ringing signal is to be used corresponding to the identified subscriber or child A. In this event distinctive ringing for child A is used to attempt to have child A answer the telephone. According to the loaded profile for child A, the answering party is prompted to speak her name. The IP remains bridged onto the connection and uses voice processing to verify a match between the spoken response and a template previously installed in the IP. Assuming verification, the switch concludes processing of the call in accord with the loaded profile information, i.e., makes the connection and permits the voice communication to occur. The IP is disconnected.

If the initial authentication of the calling party fails, i.e., if the caller states her name to be that of child C but the voice verification fails to confirm a match, the calling party may be permitted one or more additional attempts. If these fail, the invention comprehends a plurality of consequential handling steps.

In the simplest case the call attempt is terminated by disconnection of the calling line or link. As another option, the incoming call may be forwarded to a third party line, such as a pre-designated line to a parent or guardian. In instances satisfying applicable provisions of law, the parent or guardian may record the ensuing dialogue. The specific handling which is performed is contained in the data information in the profile which has been personalized for the subscriber represented by child A.

The foregoing example has dealt with affording protection to latchkey children in the case of incoming calls. It is a further feature of the invention that the invention provides a system for preventing the initiation of proscribed outgoing calls from the subscriber premise and line. Following is an example of the operation of such protection.

As previously stated, the preferred routing of the calls in accord with the invention utilizes AIN type call processing. In the case of one of the children A or B initiating a call the phone goes off-hook. The serving central office $11_1$ detects the off-hook and commences its call processing.

Specifically, the central office assigns a register in the call store 67 to this call and loads profile information associated with the off-hook line from the disc storage 63 into the assigned register. In this case, the central office 11₁ is an SSP capable office, and the loaded profile data indicates an off-hook immediate trigger set against the particular line. The serving SSP type office 11₁ therefore detects this off-hook PIC as an AIN trigger.

In response to the off-hook and the off-hook trigger set in the subscriber's profile, the SSP type central office switch 11₁ launches a query to the SCP 19. Specifically, the SSP 11₁ creates a TCAP query message containing relevant information, such as the office equipment (OE) number assigned to the off-hook line, and transmits that query over an SS7 link to one of the STPs 15.

The STP 15 relays the query message over the appropriate link to the SCP 19. The query from the SSP central office 11₁ identifies the caller's line by its associated office equipment (OE) number and possibly by a single telephone number associated with the off-hook line.

In response to a query, the SCP 19 accesses its a database, typically, the MSAP database set up in the ISCP, to determine how to process the particular call. The SCP 19 identifies an access key in the query and uses the key to retrieve the appropriate record from the database. In this case, the query indicates an off-hook trigger as the trigger event, therefore the SCP 19 uses the calling party office equipment (OE) number as the access key. The SCP 19 retrieves a call processing record (CPR) corresponding to the office equipment (OE) number associated with the off-hook line and proceeds in accord with that CPR.

The CPR will provide information necessary for routing the call to some node of the network that will perform speaker identification/verification (SIV), in this example the SIV is a function performed by an Intelligent Peripheral (IP). Therefore the CPR provides information for routing the call to the nearest available IP having the SIV capability.

Based on the CPR, the SCP 19 formulates a response message instructing the SSP central office 11₁ serving the customer to route the call. In this case, the message includes information, e.g. a office equipment (OE) number or telephone number, used for routing a call to the identified IP 23. The SCP 19 formulates a TCAP message in SS7 format, with the destination point code identifying the SSP office 11₁. The SCP 19 transmits the TCAP response message back over the SS7 link to the STP 15, and the STP 15 in turn routes the TCAP message to the SSP central office 11₁.

The SSP type switch in the central office 11₁ uses the routing information to connect the call to one of the lines or channels to the IP 23. A two-way voice grade call connection now extends between the calling station 1_A and the IP 23. In the present example, the switch actually connects the off-hook line to the line to the IP before providing dial tone.

As noted above, the communication link to the IP 23 provides both line connections and signaling, preferably over a primary rate interface (PRI) type ISDN link. When the central office 11₁ extends the call from the calling party's line to a line circuit (over a B channel) to the IP 23, the switch in that office also provides call related data over the signaling link (D channel for ISDN). The call related data, for example, includes the office equipment (OE) number normally associated with the off-hook line and possibly the telephone number for that line.

In response to the incoming call, the IP 23 will seize the line, and it will launch its own query to the SCP 19 (step S7). In the preferred network illustrated in FIG. 1, the IP 23 and the SCP 19 communicate with each other via a separate second signaling network 27, for example utilizing either an 1129+ protocol or a generic data interface (GDI) protocol. The query from the IP 23 again identifies the caller's line by at least its associated office equipment (OE) number.

In response to the query from the IP 23, the SCP 19 again accesses the appropriate CPR and provides a responsive instruction back through the network 27 to the IP 23. Although the IP 23 could passively monitor any speech that the user might utter, the preferred implementation utilizes a 'Challenge Phase' to prompt the user to input specific identifying information. In this case, the instruction causes the IP 23 to provide a prompt message over the connection to the caller. Here, the signal to the caller is preferably an audio announcement prompting the caller to speak personal information. In one preferred example, the IP plays an audio prompt message asking the caller, 'Please say your name'. The process may ask for any appropriate identifying information.

The signal received by the IP 23 goes over the lines and through the central office switch(es) for presentation via the off-hook telephone 1_A to the calling party. In response, the caller will speak identifying information into their off-hook telephone, and the network will transport the audio signal to the IP 23. When the IP 23 receives speech input information during actual call processing, for this service example, the IP analyzes the speech to extract certain characteristic information.

As previously explained, the IP 23 stores a template or other voice pattern information for each person who has the personalized service in the area that the IP normally services. If the IP 23 does not store the particular template or feature information it needs to process a call, the IP 23 can communicate with a remote IP 23_R to obtain that information. In the present shared line example, the IP 23 will store template or feature data for each subscriber associated with the particular off-hook line.

When the IP 23 receives input speech and extracts the characteristic information during actual call processing, the IP compares the extracted speech information to stored pattern information, to identity and authenticate the particular caller. In the present example, the voice authentication module 233 in the IP 23 compares the extracted speech information to the stored template or feature data for each subscriber associated with the particular off-hook line. This includes the children A and B.

The IP 23 determines if the information extracted from the speech input matches any of the stored template data feature data for an identifiable subscriber. If there is a match, the IP now knows the identity of the calling subscriber. Based on the identification of the calling subscriber, the IP 23 selects a virtual office equipment (OE) number from storage that corresponds to the subscriber.

The IP 23 formulates a D-channel signaling message containing the virtual office equipment (OE) number together with an instruction to load that OE number into the register assigned to the call in place of the OE number of the off-hook line. The IP 23 supplies the message to the SSP central office switch 11₁ over the D-channel of the ISDN PRI link. In response, the administrative module processor 61 rewrites the OE number in the register assigned to the call using the OE number received from the IP 23.

Upon rewriting the OE number in the register, the administrative module processor 61 of central office switch 11₁ also reloads the profile information in the register. Specifically, the administrative module processor 61 retrieves profile information associated with the virtual office equipment (OE) number from the disc storage 63 into the register. As such, the profile information in the assigned register in the call store 67 now corresponds to the identified subscriber, rather than to the off-hook line.

The profile information provides a wide range of data relating to the subscriber's services, including the permissions and restrictions applicable to the involved children. In the presently preferred implementation, when the central office switch $11_1$ reloads the profile, the central office disconnects the link to the IP 23 and connects tone receivers to the caller's line. Optionally, the central office $11_1$ may provide a 'dial tone' or other message over the line. The caller now dials digits in the normal manner, and the switch in the central office $11_1$ loads the dialed digits into the assigned register within the call store 67. The central office 11 utilizes the dialed digits and the subscriber's profile data to process the call. If the dialed digits represent a call permitted to the caller further processing proceeds. On the other hand, if the number is not included in those which are permitted to the particular caller one of several alternative steps may follow. In the simplest situation the call processing may be discontinued with or without an audio announcement to the caller. As an alternative the call may be completed to a directory number supplied by the parent or guardian who then admonishes the child.

Assuming that the dialed digits match digits stored in the callers profile, it is a feature of the invention that actual verification of the authenticity of the responding party is performed. To this end an IAM message is sent to the destination SSP containing data in addition to that which is typically carried. This data information instructs the SSP to execute a pre-designated verification procedure. According to one preferred procedure the destination SSP sets up a voice connection between the IP and the called terminal. This is established via data signaling similar to that described in establishing a voice link between the originating central office and the IP for the originating end voice processing.

The availability of the called terminal is established by standard CCIS signaling, ringing signals are sent, and a responding party goes off-hook. Again a challenge prompt is delivered requesting the name of the responding party. When this is provided the signal is processed in the IP against a pre-prepared template which is mandated by the personal profile of the caller. Assuming a match is established, this is signaled by the IP to the originating switch and a trunk connection is established between the calling and called terminals. If no match can be established after a pre-specified number of attempts the caller is advised and the call processing discontinued. An audio announcement to the calling party is preferably provided.

According to yet another feature of the invention a system is provided for protecting the subscriber against the calls of stalkers or other recurring threatening calls. In this situation it is assumed that the unwanted calls have been received a sufficient number of times to allow the called line to record and create voice templates for the threatening caller. These may include the name or pseudonym used by the caller and optionally the name of the called party, where the stalker is calling for a particular person.

In the handling of this type of call pursuant to one preferred embodiment of the invention, the protected or guarded line and directory number have a terminating attempt trigger (TAT) set against the particular line. When the central office SSP which serves that line or local loop detects a call (receives the IAM) to that line, it loads profile information associated with the called line. The loaded profile data indicates a terminating attempt trigger (TAT) set against the particular line. The SSP interacts with the SCP, and finds that identification of the called party is necessary. In accord with directions from the SCP the call is routed to the IP.

The IP prompts the caller to identify a desired called party. The IP uses speech recognition processing to identify the desired called party from those associated with the premises line. Based on identification of the called subscriber, the IP signals the SSP switch to substitute the CPR or profile of the now identified called party for the presently loaded CPR designated by the line OE. Thus the virtual OE profile of the specific called party is substituted for the line profile.

This substitution having been accomplished, the installed profile contains data information which indicates that the identity of the calling party is to be sought. The IP is apprised of this requirement and uses another prompt to the calling party to identify himself. This may be a prompt such as "Who is calling?". A template for the name of the harassing party is preferably maintained in the IP. This template is now used by the IP to verify that the caller is in fact the harasser or stalker. Alternatively the IP speech recognition module is trained to recognize the name.

The virtual OE profile of the called party contains data information for further handling of the call. A number of alternatives may be provided either singly or in combination. The profile may direct that the serving central office forward the call to a specified directory number of a third station. This station may constitute a terminal of a police authority or investigative organization. Police pursuit of the caller may ensue if sufficient information is available. The terminal may also record the ensuing dialog. In the case where a stalker situation pertains to minors, the call may be forwarded to a station of a parent or guardian. This option may occur either as an alternative or in addition to forwarding the call to the station of a police authority. Again recording may be performed if appropriate.

While the foregoing handling of an undesired call has been described in terms of a stalker, it will be understood that the methodology may be applicable to other types of calls. As a further example, pornographic calls may be intercepted and handled in a like manner. Assuming the satisfaction of applicable legal requirements evidence may be gathered to assist in criminal or civil legal proceedings.

In addition to the foregoing, the invention also comprehends providing assistance to authorities and police in the apprehension of wanted individuals. To this end the instant embodiment of the invention includes identification of the site of origination of the offending call. This information may then be automatically brought to the attention of the cognizant law enforcement authority on a real time basis. As a further alternative the information may be used to trigger other legally sanctioned investigatory or police action.

In the type of two party situation now under consideration the calling target individual may be subject to a court order prohibiting contact with the called party. In addition to the prohibition, the court order may authorize monitoring and recording of any prohibited calls and apprehension of the offending party. Such situations may be encountered with stalkers, pornographic callers, in troubled marital situations, among others. In the cases of stalkers and pornographic callers there are two party situations involving illegal activity, although the caller may be identified only by voice. However, monitoring and recording may be authorized as well as apprehension of the offender.

In the known stalker situation there may be an outstanding order for arrest which is not limited to apprehending the stalker when engaged in the illegal activity. However, the stalker may be known only by voice identification and the whereabouts of the stalker is usually unknown. Under such circumstances the methodology of this embodiment of the invention provides an opportunity to track the location of the stalker and to possibly gain further information to permit more specific identification. Identification of the site of the stalker or other such caller during actual engagement in a prohibited telephone conversation may offer the optimal possibility of effecting prompt apprehension. It will be appreciated that even though there may be an outstanding order for the arrest of the person involved, it is impractical, as well as violative of legal rights, to indiscriminately monitor a large number of telephone lines of uninvolved and uninformed parties. The two party situation offers both a legal and practical application for the use of the features of the present embodiment of the invention.

In one illustrative application of this embodiment of the invention, the aggrieved individual and associated subscriber terminal are known. This information identifies the subscriber line and its office equipment or OE number or designation, the aggrieved individual, and his or her virtual OE number. It is assumed that the speech processing facility, preferably an intelligent peripheral or IP has been provided with appropriate speech templates to implement speech identification and/or authentication of an offending voice identifiable individual. The virtual OE designation of the aggrieved individual identifies a personal customer profile record (CPR) for the aggrieved party. This profile defines procedures to be followed upon the aggrieved party receiving a call from a caller who has been previously identified by his or her speech as the wanted offending party.

An illustrative example of the operation of this embodiment of the invention under these circumstances is now described. In this case speech recognition is used with respect to the voice of the calling party. Current speech recognition technology permits recognition with a reasonable degree of certitude based on training from a limited sample of recorded speech of a subject. In a situation of this type the target of the speech recognition is a wanted person and is not likely to cooperatively participate in any type of prompting procedure which may seem suspicious. As a result, it may be necessary to rely on such sophisticated speech recognition techniques as applied to random speech. On the other hand, in some instances it may be found possible to obtain speech templates of the target person uttering the name of the aggrieved party. This alone may prove sufficient to provide the necessary identification.

In such situations the instant embodiment of the invention relies on the speech recognition capability of the module 235 in the IP 23. The speech recognition module 235 enables the IP to analyze incoming audio information to recognize vocabulary words. The IP interprets the spoken words and phrases to determine subsequent action. For example, the IP may recognize the target caller speaking the name of a called subscriber and use the subscriber identification obtained in this manner to instruct the terminating central office to thereafter control the call in accord with that named subscriber's profile. On the other hand, the target caller may simply go on hook if he or she does not recognize the voice of the aggrieved party answering the telephone, so that another speech recognition procedure is necessary.

In this example the offending or target party may go off hook at any telephone in the relevant network. This creates a corresponding signal or change in state on the line to the central office to which the telephone is connected. In the call sequence, the off-hook signal acts as a type of service request, i.e. a request to make an outgoing call. The originating central office detects the off-hook and commences its call processing. Specifically, the originating central office assigns a register to the call in the call store of the originating central office switch. The switch loads profile information associated with the off-hook line from the disc storage of the switch into the assigned register.

The originating central office provides dial tone or the like over the line, the caller dials digits corresponding to the desired destination and the switch in the originating central office begins its processing to route the call through the network. The originating central office uses the dialed number to initiate a CCIS communication with the exchange serving the intended destination, in this example the terminating central office, which is assumed to be an SSP central office.

Specifically, the originating central office generates an Initial Address Message (IAM) for transmission to the terminating central office. The IAM message includes the SS7 destination point code (DPC) of the terminating central office and the SS7 origination point code (OPC) of the originating central office for addressing purposes. The payload portion of the IAM message includes the called and calling numbers. The originating central office transmits the IAM message through the CCIS network to the distant terminating office.

When the terminating office receives the IAM message, the administrative module processor for that office retrieves the customer profile for the number in the destination number field of that message (e.g. the number for the telephone line identified by OE in the destination central office for that number), from its mass storage system and loads that profile into one of its call store registers.

The subscriber for that line has personal dial tone service and a virtual OE assignment for each individual associated with that service. Usually such individuals reside at the site or subscriber premises at which the line or local loop terminates. The loaded profile for the OE of the line itself indicates a terminating trigger for that line and OE. The office of the subscriber, being an SSP type office, detects this call PIC as an AIN trigger.

In response to the IAM and the terminating attempt trigger (TAT) set in the subscriber's profile, the SSP type terminating central office switch launches a query to the SCP. Specifically, the SSP creates a TCAP query message containing relevant information, such as the office equipment (OE) number assigned to the called number line, and transmits that query over an SS7 link to one of the STPs. The query includes a destination point code and/or a global title translation addressing the message to the SCP, and the STP relays the query message over the appropriate link to the SCP. The query from the SSP terminating central office identifies the called line by its associated office equipment (OE) number and possibly by a single telephone number associated with the called line.

In response to a query, the SCP accesses its a database, typically, the MSAP database set up in the ISCP, to determine how to process the particular call. The SCP identifies an access key in the query and uses the key to retrieve the appropriate record from the database. In this case, the query indicates a terminating attempt trigger as the trigger event, therefore the SCP uses the called line office equipment (OE) number as the access key. The SCP retrieves a call processing record (CPR) corresponding to the office equipment (OE) number associated with the called line and proceeds in accord with that CPR.

The call processing by the destination central office switch utilizes the loaded subscriber profile information. In this instance the called station subscribes to personal dial tone service and the line OE is associated with multiple virtual OEs assigned to individuals residing at the same subscriber premises. Thus the subscriber profile of the OE specifies procedures to be followed to implement the particular personal dial tone service desired by the subscriber.

In the instant preferred embodiment of the invention a situation exists wherein an individual to whom one of the virtual OEs is assigned is being harassed or threatened by an individual who has been identified by voice only. The full identity and location of that target individual is not known. However, the threatened individual has been repeatedly harassed by telephone at the subscriber premises via the subscriber line. It is desired to locate and apprehend the offending party.

In order that this may be accomplished according to this preferred embodiment of the invention, it is desired to have the offender making a call to the threatened party speak a specific or sufficiently extended utterance to permit the calling party to be identified as the offending individual. According to one procedure, the CPR of the subscriber line OE for the premises may contain instructions to deliver a prompt to all callers. That prompt could request all such callers to speak the name of the called party. In this procedure the IP is equipped with speech templates to permit speech identification/verification or SIV of a specific virtual OE from the utterance of the name by the caller. However, if the caller is the offending party, he or she is likely to be wary and may be suspicious of such a prompt delivered request. In that event the party may simply go on-hook and thwart any possibility of identification or apprehension.

A more preferred procedure, pursuant to one feature of this embodiment of the invention, is to instruct all residents at the subscriber premises to always answer the telephone by speaking their own name, such as, "This is Jane" or "This is John," as the case may be. The IP has been provided with voice trained templates to enable identification of the desired virtual OE of each named individual from such a name utterance.

In response to the IAM, and to the terminating attempt trigger (TAT) set in the subscriber's profile, and to the procedures specified in the subscriber's profile, the SSP switch routes the call to the nearest IP having the necessary SIV capability. A two way voice grade call connection now extends between the called line and the IP. As noted above, the communication link to the IP 23 provides both line connections and signaling, preferably over a primary rate interface (PRI) type ISDN link. When the central office $11_1$ extends the call from the calling party's line to a line circuit (over a B channel) to the IP 23, the switch in that office also provides call related data over the signaling link (D channel for ISDN). The destination central office switch now provides ringing signal to the called line via its OE. As a result one of the subscribers at the premises goes off-hook. It is optional as to whether or not the calling party is voice connected at this stage.

The next action is dependent on the identity of the person at the subscriber premises who answers the telephone. In this example it is assumed that the threatened or harassed individual answers. As previously stated, all answering parties are instructed to first identify themselves. Here the threatened answering party does so, as for example, "This is Jane." When the IP receives input speech and extracts the characteristic information during actual call processing, it compares the extracted speech information to stored pattern information to identity and authenticate the particular answering party or subscriber. In the present example, the voice authentication module 233 in the IP 23 compares the extracted speech information to the stored template or feature data for each subscriber associated with the particular off-hook line. The IP now knows the identity of the called subscriber. Based on the identification of the called subscriber, the IP 23 selects a virtual office equipment (OE) number from storage that corresponds to the subscriber.

The IP 23 formulates a D-channel signaling message containing the virtual office equipment (OE) number together with an instruction to load that OE number into the register assigned to the call in place of the OE number of the off-hook line. The IP 23 supplies the message to the SSP central office switch $11_1$ over the D-channel of the ISDN PRI link (step S14). In response, the administrative module processor 61 rewrites the OE number in the register assigned to the call using the OE number received from the IP 23.

Upon rewriting the OE number in the register, the administrative module processor 61 of central office switch $11_1$ also reloads the profile information in the register. Specifically, the administrative module processor 61 retrieves profile information associated with the virtual office equipment (OE) number from the disc storage 63 into the register. As such, the profile information in the assigned register in the call store 67 now corresponds to the identified subscriber, rather than to the off-hook line.

The profile information provides a wide range of data relating to the subscriber's services. Included in that information the profile data provides necessary instructions to alert the IP to prepare to attempt to match the speech of the calling party to identify the calling party as the target. If the procedure which is specified in the CPR includes the option of not voice connecting the calling party to the called line to hear the live response of the answering party subscriber, the IP is directed to record the response for playback to the calling party when that party has been voice connected. The calling party is now connected to the called line, which has a voice connection to the IP, i.e., it is bridged to the IP. The IP plays the recorded response to the calling party and prepares to monitor the speech of the caller and attempt to match it to that of the target.

If the IP is able to establish a match through its SIV procedures, the conversation is recorded. In addition, and as an example of procedures which may be specified according to one preferred embodiment of the invention, the loaded profile directs that the destination SSP interact with the IP to use the identity of the calling telephone number to identify the site of the calling telephone, and to send that information to the police. It is assumed that the police have been previously alerted to the situation and have authority and orders to apprehend the offending individual. As an attempt to provide the police with maximum time to respond, the threatened individual may have been requested to attempt to hold the offending party on the line as long as possible. The IP may be maintained in a bridged condition in order to monitor and record the conversation as a legal evidence procurement measure. In addition the conversation may also be bridged to the police.

The forwarding of the information locating the calling telephone may be implemented as follows. The loaded profile of the harassed party includes data that directs and initiates a sequence such as the following. The originating end office has addressed and transmitted the IAM message with the called and calling telephone numbers. The terminating end office launches a second query message through one or more of the STP(s) to the LIDB database 21 in FIG. 1. The query message includes both the telephone number associated with the calling station or its telephone line as well as a code identifying the virtual OE and nature of this request.

The LIDB database uses the calling party telephone number and the code received in the query, to retrieve that calling subscriber terminal or line account file record from the database. This includes the name and address of the subscriber for that telephone station. The LIDB database 21 compiles a TCAP call control message including the name and address data and returns that call control message to the terminating central office via the SS7 network. The terminating central office switching system receives the call control message from the LIDB database and shares this information with the IP via the signaling circuit. The same information is transmitted to the police via signaling and/or voice circuit. The police are now bridged onto the voice conversation and have been provided with the address from which the offending call is being conducted. If a patrol car is in the vicinity of the identified address, or if the harassed person is able to hold the offending caller on the line a sufficient time, the car may be radio dispatched and an apprehension may be accomplished.

In the foregoing example it was assumed that the harassed party answered the telephone. The profile of that person was then installed based on that person identifying his or herself in answering the telephone. In the case where the telephone is answered by a resident of the premises other than the harassed party, that party answers with the same pre-specified greeting, such as, "This is John." In this situation the profile in the CPR corresponding to the subscriber line may specify that the profile of that individual, namely John, be substituted for the line CPR. Unless the caller specifically requests to speak to the harassed party by name, the call will proceed in accord with the CPR of the answering party, in this instance, John.

If the caller, as yet unidentified, asks to speak to the harassed party, Jane in this example, alternative procedures may be utilized according to this embodiment of the invention. According to a first procedure, the answering party, John, calls the harassed party, Jane, in such a manner that his call for Jane is fully audible to the telephone microphone. This utterance is identified by the bridged IP SIV, and the CPR of Jane is substituted by the destination central office switch. Jane answers in the pre-agreed format, such as, "This is Jane." The CPR for Jane has been entered and the same procedure is followed as has been previously described in the instance in which Jane answered the telephone.

As an alternative to this procedure, an answering party other than Jane may say "Please hold," place the call on hold, and call Jane to the telephone. Jane may then remove the call from hold, and answer in the pre-agreed manner, such as, "This is Jane." The CPRs of all residents of the subscriber premises may contain call handling instruction data directing interpretation of hold signals on this line as directing connection to the SIV facilities of the IP and directing the IP to stand by to implement CPR selection corresponding to the next matching name of a subscriber. As a result the switch substitutes the CPR for Jane on identifying her name through SIV. The CPR for Jane is now entered and the same procedure is followed as has been previously described in the instance in which Jane answered the telephone. As a still further alternative to the foregoing, all subscriber OE profiles at the subscriber premises may contain processing instructions to cause the IP to be connected upon execution of a *HOLD sequence. In this case all subscribers are instructed to use a *HOLD sequence when calling the threatened party to the telephone.

Reference is now had to FIG. 6 to facilitate description of yet another embodiment of the inventions. The present day popularity of voice mail service has been previously mentioned in discussing the prior art background of the present inventions. There has also been mention of the Intelligent Peripheral or IP 23 (FIGS. 1 and 3) having a voice mail server 239 for use by the network illustrated in FIG. 1. FIG. 6 provides a diagrammatic depiction of one available voice mail server suited for use in a preferred embodiment of an implementation for providing voice mail services in the present multi-subscriber per line environment.

Referring to FIG. 6, the centralized message service or voice mail system in the illustrated example comprises voice messaging equipment such as a voice mail system 120. The voice mail system 120 includes a digital switching system (DSS) 121, a master control unit (MCU) 123, a number of voice processing units (VPUs) 125 and a master interface unit (MIU) or concentrator 127. The master control unit (MCU) 123 of the voice mail system 120 is a personal computer type device programmed to control overall operations of the system 120.

Each of the voice processing units 125 also is a personal computer type device. The voice processing units 125 each include or connect to one or more digital mass storage type memory units (not shown) in which the actual messages are stored. The mass storage units, for example, may comprise magnetic disc type memory devices. Although not specifically illustrated in the drawing, the voice processing units 125 also include appropriate circuitry to transmit and receive audio signals via T1 type digital audio lines. An ETHERNET type digital network 129 carries data signals between the MCU 123 and the voice processing units 125. The Ethernet network 129 also carries stored messages, in digital data form, between the various voice processing units 125. The system 120 further includes T1 type digitized audio links 128 between the DSS switch 121 and each of the voice processing units 125.

The voice mail system 120 connects to the central office switching system 11 via the network 240 and the direct talk modules 231A and 231B and ISDN PRI TRUNKS which provide voice and signaling channels. Communication with the SSPs in the central offices may also be had via the network 240, IP communication server 243 and router 241. The MIU 127 is a data concentrator which effectively provides a single connection of many data signal links into the MCU 123 of the voice mail system.

The above described voice mail system architecture is similar to existing voice mail type central messaging systems, such as disclosed in U.S. Pat. No. 5,029,199 to Jones et al., although other messaging system architectures such as disclosed in the other patents cited above could be used. See also U.S. Pat. No. 5,661,782 to Farris and Bartholomew for additional description of operation of this type of voice mail system.

For each party who subscribes to a voice mail service provided by the centralized messaging system 120, the MCU 123 stores information designating one of the voice processing units 125 as the "home" unit for that subscriber. Each voice processing unit 125 stores generic elements of prompt messages in a common area of its memory. Personalized elements of prompt messages, for example recorded representations of each subscriber's name spoken in the subscriber's own voice, are stored in designated memory locations within the subscriber's "home" voice processing unit.

In voice mail systems of the type discussed above, a subscriber's "mailbox" does not actually correspond to a particular area of memory. Instead, the messages are stored in each "mailbox" by storing appropriate identification or tag data to identify the subscriber or subscriber's mailbox to which each message corresponds.

Each time a call comes in to the voice mail system 120, the master control unit 123 controls the digital switching system 121 to provide a multiplexed voice channel connection through to one of the voice processing units 125. Typically, the call connection goes to the "home" voice processing unit for the relevant subscriber. The voice mail subscriber is identified by data transmitted from the switching system 11, as described above, if the call is a forwarded call. If all 24 T1 channels to the "home" voice processing unit are engaged, the central processing unit 123 controls switch 121 to route the call to another voice processing unit 125 which is currently available.

The voice processing unit connected to the call retrieves prompt messages and/or previously stored messages from its memory and transmits them back to the calling party via the internal T1 line 128, the DSS switch 121 one of the voice channels, central office switching system 11 and the calling party's telephone line. The voice processing unit 125 connected to the call receives incoming messages from the caller through a similar route and stores those messages in digital form in its associated mass storage device.

When the incoming call is a forwarded call, the connected voice processing unit 125 provides an answering prompt message to the caller, typically including a personalized message recorded by the called subscriber. After the prompt, the voice processing unit 125 records a message from the caller and identifies that stored message as one for the called subscriber's mailbox.

At times the connected voice processing unit 125 will not have all necessary outgoing messages stored within its own associated memory. For example, a forwarded call normally will be connected to the called subscriber's "home" voice processing unit 125, but if the home unit is not available the forwarded call will be connected to a voice processing unit 125 other than the subscriber's home voice processing unit. In such a case, the connected unit 125 requests and receives from the home unit 125 the personalized components of the answering prompt message via the data network 129. The connected voice processing unit 125 will store the transferred message data in its own memory, and when necessary, will play back the transferred data from its own memory as outgoing messages in the exact same manner as for any prompts or greeting messages originally stored in its own memory.

The connected voice processing unit 125 also will store any incoming message in its own associated memory together with data identifying the message as one stored for the called subscriber's mailbox. As a result, the system 120 actually may store a number of messages for any given subscriber or mailbox in several different voice processing units 125. Subsequently, when the voice mail subscriber calls in to the voice mail system 120 to access the subscriber's mailbox, the call is connected to one voice processing unit 125. Again, this call typically goes to the home unit 125 but would go to a different available one of the units 125 if the home unit is not available at the time. In response to appropriate DTMF control signals, or preferably voice signals, received from the subscriber, the connected voice processing unit retrieves the subscriber's messages from its own memory and plays the messages back to the subscriber. If any messages are stored in other voice processing units, the connected unit 125 sends a request the other units 125 to download any messages for the subscriber's mailbox those units have actually stored. The downloaded messages are stored in the memory of the connected voice processing unit 125 which replays them to the subscriber.

In a typical usage of the present embodiment of the invention there may be four subscribers for the telephone station $1_A$ which is connected to a line or local loop having a single telephone number and office equipment or OE number. Each of the four subscribers is provided with a personalized service profile or customer profile (CPR) which is identified by a virtual office equipment or OE number. As previously explained a virtual office equipment number refers to "virtual" equipment which has no real existence in the relevant central office. The profiles include for each subscriber a range of information relating to subscribers services, such as service features, classes of service, individual billing options, information relating to restrictions applied to individual users, as well as the performance of functions related to that user. Each of the four subscribers in this example subscribes to voice mail service and is assigned a mail box or partition of a mail box in the voice mail server 239 in the intelligent peripheral or IP 23. It will be understood that while the voice mail unit or facility is here shown as integrated into the IP this need not be the case. The voice mail unit may be provided as a stand alone unit as shown, for example in the above cited Jones et al. Patent. The subscription to the voice mail service and identification of a mail box is included in the information in each customer profile relating to the specific subscriber. Similarly the information data may prescribe that a call is to be forwarded to the voice mail system on a 'busy' and/or 'no-answer' condition.

When the serving central office SSP 11 detects a call to a line having the personalized service, processing hits a terminating attempt trigger (TAT). The SSP interacts with the SCP 19 and routes the call to the IP 23. The IP 23 prompts the caller to identify a desired called party, e.g. one of the subscribers sharing the single line. Menu announcement together with speech or voice utterance recognition processing by the IP 23 enables identification of the desired called party from those subscribers associated with the line. Based on identification of the called subscriber, the IP 23 signals the SSP switch 11 to load profile data for that subscriber into the register assigned to the call in the call store. The switch 11 thereupon uses the selectively loaded personal profile information for terminating the call. The IP disconnects, and the SSP central office 11 processes the call in accord with the loaded profile information which is identified by the virtual OE of the called and now identified subscriber. As an alternative or conjunctively with this procedure, the SSP may first load into the assigned register a generic customer profile for the OE for the line itself. Such a service profile may contain information which is generic to the subscribers served by that line and OE umber, particularly subscribers who may not subscribe to any enhanced services.

For example, in accord with the now loaded profile the central office 11 may provide a distinctive ringing signal corresponding to the identified subscriber. This service enables distinctive ringing for multiple subscribers on one line without assigning each subscriber a separate telephone number. In this example the loaded profile information specifies forwarding of the call to the identified subscriber's identified mailbox in event of a busy or no-answer condition.

It is a feature of this embodiment of the invention that the call is initially routed to the intelligent peripheral. The IP includes a so-called 'challenge' wherein the caller is requested to speak his or her name. The intelligent peripheral speech identification capability includes a previously obtained template or templates to permit identification of the called party through use of that template or equivalent speech identification/verification procedure. Upon making the identification the IP selects a virtual office equipment (OE) number from the storage that corresponds to the subscriber. The IP then sends instructions to load that OE number into the register assigned to the call in place of the OE number of the subscriber premises line or local loop. In response, the administrative module processor 61 rewrites the OE number in the register assigned to the call using the OE number received from the IP 23.

Upon rewriting the OE number in the register, the administrative module processor 61 of central office switch $11_1$ also reloads the profile information in the register. Specifically, the administrative module processor 61 retrieves profile information associated with the virtual office equipment (OE) number from the disc storage 63 into the register. As such, the profile information in the assigned register in the call store 67 now corresponds to the identified subscriber, rather than to the customer premises line. Having loaded the proper customer profile record in the assigned call store register the destination central office utilizes the dialed digits and the now loaded subscriber's profile data to process the call. Thus, the generic profile corresponding to the OE number ('real OE number' for actual equipment) may be replaced by the profile corresponding to a virtual OE number.

Pursuant to the loaded profile the central office transmits to the called premises line a distinctive ringing signal which identifies the subscriber corresponding to the virtual OE number and profile. Also pursuant to the profile a no answer (or busy/no answer) condition results in forwarding the call to the intelligent peripheral via the voice and signaling links. When the call comes in to the voice mail system, the master control unit 123 controls the digital switching system 121 to provide a multiplexed voice channel connection through to one of the voice processing units 125. Typically, the call connection goes to the "home" voice processing unit for the relevant subscriber. The voice mail subscriber is identified by data transmitted from the switching system 11, as described above.

The voice processing unit connected to the call retrieves prompt messages and/or previously stored messages from its memory and transmits them back to the calling party via the internal T1 line 128, the DSS switch 121 one of the voice channels, central office switching system 11 and the calling party's telephone line. The voice processing unit 125 connected to the call receives incoming messages from the caller through a similar route and stores those messages in digital form in its associated mass storage device.

The connected voice processing unit 125 provides an answering prompt message to the caller, typically including a personalized message recorded by the called subscriber. After the prompt, the voice processing unit 125 records a message from the caller and identifies that stored message as one for the called subscriber's mailbox. Subsequently, when the voice mail subscriber calls in to the voice mail system 120 to access the subscriber's mailbox, the call is connected to one voice processing unit 125. Again, this call typically goes to the home unit 125 but would go to a different available one of the units 125 if the home unit is not available at the time. In response to appropriate DTMF control signals received from the subscriber, the connected voice processing unit retrieves the subscriber's messages from its own memory and plays the messages back to the subscriber. If any messages are stored in other voice processing units, the connected unit 125 sends a request the other units 125 to download any messages for the subscriber's mailbox those units have actually stored. The downloaded messages are stored in the memory of the connected voice processing unit 125 which replays them to the subscriber.

According to another feature of this embodiment of the invention the subscriber's profile contains data which prescribes a distinctive interrupted dial tone to indicate the presence of stored voice mail. Each of the four subscribers in this example subscribes to voice mail service and is assigned a mail box or partition of a mail box in the voice mail server 239 in the intelligent peripheral or IP 23. Each subscriber may also be assigned a distinctive interrupted dial tone, such as, for example, two short tones, a long and a short, etc., to indicate the presence of voice mail. However, such a distinctive tone is not necessary as will now become apparent.

As has been previously described, when one of the subscribers in the relevant multi-subscriber per line premises goes off-hook, this is interpreted as a request to make an outgoing call. The associated central office commences its call processing. Specifically, the central office assigns a register in the call store 67 to this call and loads profile information associated with the off-hook line from the disc storage 63 into the assigned register. In this case, the central office $11_1$ is an SSP capable office, and the loaded profile data indicates an off-hook immediate trigger set against the particular line. The serving SSP type office $11_1$ therefore detects this off-hook PIC as an AIN trigger.

In response to the off-hook and the off-hook trigger set in the subscriber's profile, the SSP type central office switch $11_1$ launches a query to the SCP 19. Specifically, the SSP $11_1$ creates a TCAP query message containing relevant information, such as the office equipment (OE) number assigned to the off-hook line, and transmits that query over an SS7 link to one of the STPs 15. The STP relays the query message over the appropriate link to the SCP 19. The query from the SSP central office $11_1$ identifies the caller's line by its associated office equipment (OE) number and possibly by a single telephone number associated with the off-hook line.

In response to a query, the SCP 19 accesses its a database, typically, the MSAP database set up in the ISCP, to determine how to process the particular call. The SCP 19 identifies an access key in the query and uses the key to retrieve the appropriate record from the database. In this case, the query indicates an off-hook trigger as the trigger event, therefore the SCP 19 uses the calling party office equipment (OE) number as the access key. The SCP 19 retrieves a call processing record (CPR) corresponding to the office equipment (OE) number associated with the off-hook line and proceeds in accord with that CPR.

The CPR provides the information necessary for routing the call to a node of the network that will perform speaker identification/verification (SIV), in this example the Intelligent Peripheral or IP. Based on the CPR, the SCP 19 formulates a response message instructing the SSP central office $11_1$ serving the customer to route the call. In this case, the message includes an office equipment (OE) number or telephone number, used for routing a call to the identified IP 23. The SCP 19 formulates a TCAP message in SS7 format, with the destination point code identifying the SSP office $11_1$. The SCP 19 transmits the TCAP response message back over the SS7 link to the STP 15, and the STP 15 in turn routes the TCAP message to the SSP central office $11_1$.

The SSP type switch in the central office $11_1$ uses the routing information to connect the call to one of the lines or channels to the IP 23. A two-way voice grade call connection now extends between the calling station $1_A$ and the IP 23. In the present example, the switch actually connects the off-hook line to the line to the IP before providing dial tone.

As noted above, the communication link to the IP 23 provides both line connections and signaling, preferably over a primary rate interface (PRI) type ISDN link. When the central office $11_1$ extends the call from the calling party's line to a line circuit (over a B channel) to the IP 23, the switch in that office also provides call related data over the signaling link (D channel for ISDN). The call related data, for example, includes the office equipment (OE) number normally associated with the off-hook line and possibly the telephone number for that line.

In response to the incoming call, the IP 23 seizes the line, and launches its own query to the SCP 19. In the preferred network illustrated in FIG. 1, the IP 23 and the SCP 19 communicate with each other via the separate second signaling network 27. The query from the IP 23 again identifies the caller's line by at least its associated office equipment (OE) number.

In response to the query from the IP 23, the SCP 19 again accesses the appropriate CPR and provides a responsive instruction back through the network 27 to the IP 23. The IP issues a 'Challenge Phase' to prompt the user to input specific identifying information. In this case, the instruction causes the IP 23 to provide a prompt message over the connection to the caller. Here, the instruction from the SCP 19 causes the IP 23 to provide an audio announcement prompting the caller to speak personal information. In one preferred example, the IP plays an audio prompt message asking the caller, 'Please say your full name'. As previously explained the process may request any appropriate identifying information.

The signal received by the IP 23 goes over the lines and through the central office switch(es) for presentation via the off-hook telephone $1_A$ to the calling party. In response, the caller speaks identifying information into their off-hook telephone, and the network transports the audio signal to the IP 23.

As noted above, an IP 23 can provide a wide range of call processing functions. In this example, the IP performs speaker identification/verification (SIV) on the audio signal received from the off-hook telephone. When the IP 23 receives speech input information during actual call processing, for this service example, the IP analyzes the speech to extract certain characteristic information. As has been described above the IP stores templates or feature data for each subscriber associated with the particular off-hook line.

When the IP 23 receives input speech and extracts the characteristic information during actual call processing, the IP compares the extracted speech information to stored pattern information, to identity and authenticate the particular caller. In the present example, the voice authentication module 233 in the IP 23 compares the extracted speech information to the stored template or feature data for each subscriber associated with the particular off-hook line.

The IP 23 determines if the information extracted from the speech input matches any of the stored template data feature data for an identifiable subscriber. If there is a match, the IP now knows the identity of the subscriber who went off-hook. Based on the identification of the calling subscriber, the IP 23 selects a virtual office equipment (OE) number from storage that corresponds to the subscriber.

The IP 23 formulates a D-channel signaling message containing the virtual office equipment (OE) number together with an instruction to load that OE number into the register assigned to the call in place of the OE number of the off-hook line. The IP 23 supplies the message to the SSP central office switch $11_1$ over the D-channel of the ISDN PRI link. In response, the administrative module processor 61 rewrites the OE number in the register assigned to the call using the OE number received from the IP 23.

Upon rewriting the OE number in the register, the administrative module processor 61 of central office switch $11_1$ also reloads the profile information in the register. Specifically, the administrative module processor 61 retrieves profile information associated with the virtual office equipment (OE) number from the disc storage 63 into the register. As such, the profile information in the assigned register in the call store 67 now corresponds to the identified subscriber, rather than to the off-hook line.

As described, the profile information provides a wide range of data relating to the subscriber's services. Included in this information is identification of this subscriber's mailbox and instructions for returning to the off-hook party a dial tone indicative of the presence of unread voice mail in that party's mailbox. This signal is delivered to the party who can then retrieve the message in the usual manner.

As a further feature of this embodiment of the invention, the subscriber profile may also contain instructions to permit a caller to elect to call directly to the mail box of any subscriber to the multi-subscriber single line service. According to this feature the SIV facility, in this instance the IP, is provided with dual templates for each subscriber. As an example, one of the two templates may identify the subscriber's name, whereas the other template may identify the subscriber's name with the addition of a command such as "mailbox." When a caller speaks the full command "John Doe mailbox," the SIV facility interprets this as an identification and authorization to connect the call directly to the mailbox. In such a situation a ringing signal would be optional when the called line is free for use. When the line is busy the call would go directly to the IP and mailbox without the necessity for the prompt announcing the availability of a mailbox service.

While the foregoing has described what are considered to be preferred embodiments of the invention, it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A method comprising:
   detecting a request to make a voice call from a first link to an identified second link through a communication network including multiple central office switching systems connected to multiple links;
   identifying one of multiple parties available via said second link by processing signals resulting from speech transmitted via said first link;

selecting a customer profile record corresponding to a virtual office equipment designation assigned to said one party;

installing said customer profile record at a central office switching system serving said second link;

pursuant to information in said customer profile record storing a voice message in message storage associated with said second link and said one party for retrieval by said one party.

2. A method according to claim 1 including the step of transmitting said stored message responsive to identification by processing signals resulting from an utterance of a party retrieving said message.

3. A method according to claim 2 wherein said transmitting said stored message is responsive to said customer profile record following its reinstallation at said central office switching system serving said second link.

4. A method according to claim 3 wherein said identification by processing signals resulting from an utterance of a party retrieving said message is at least partially responsive to information contained in a customer profile record different than said customer profile record corresponding to a virtual office equipment designation assigned to said one party.

5. A method according to claim 4 wherein said reinstallation of said customer profile record is responsive to said identification by processing signals resulting from an utterance of a party retrieving said message.

6. A method according to claim 1 wherein said storing of a voice message is responsive to a busy or no answer condition at said second link.

7. A method according to claim 6 wherein said storing of a voice message is responsive to a voice prompt responsive to detection of said busy or no answer condition at said second link.

8. A method according to claim 1 wherein said storing of said voice message is responsive to processing of speech signals transmitted from said first link.

9. A method according to claim 8 wherein said last named speech comprises at least a portion of said speech transmitted via said first link identifying said one of multiple parties available via said second link.

10. A method according to claim 1 wherein each of said multiple parties is assigned a personalized customer profile record corresponding to an individual virtual office equipment designation.

11. A method comprising:

detecting a request to make a voice call from a first link to a second link through a switched telecommunication network including multiple central office switching systems connected to multiple links;

installing a first customer profile record corresponding to an office equipment designation assigned to said second link in a central office switching system serving said second link:

pursuant to information in said first customer profile record establishing a speech connection between said first link and a speech processing facility;

identifying by speech processing an utterance identifying a called party, said utterance transmitted via said first link to said speech processing facility;

selecting a second customer profile record corresponding to a virtual office equipment designation assigned to said called party;

replacing said first customer profile record with said second customer profile record;

pursuant to information in said second customer profile record establishing a speech connection between said first link and a message storage associated with said second link;

storing a voice message for said called party in said message storage.

12. A method according to claim 11 wherein said utterance identifying said called party emanates from a party initiating said request to make said voice call.

13. A method according to claim 11 including the step of transmitting said stored message responsive to speech processing identification of a party requesting said message.

14. A method according to claim 13 wherein said speech processing is responsive at least in part to information in said second customer profile record following reinstallation of said second customer profile record at said central office switching system serving said second link.

15. A method according to claim 14 wherein said reinstallation is responsive to processing of speech of said called party.

16. A method according to claim 15 wherein the speech of said called party which is processed is received by said processing facility via said second link.

17. A method according to claim 11 wherein said second link is associated with multiple customers, each of said multiple customers being assigned a personalized customer profile record corresponding to an individual virtual office equipment designation.

18. A method for processing a call in multilink telecommunication network comprising the steps of:

assigning subscriber profiles to subscribers associated with a first of said links connected to a first switching system;

at least one of said subscriber profiles including data indicative of subscription to messaging service;

designating in a messaging system a storage capability for said at least one subscriber profile;

identifying through speech signal processing the subscriber profile of one of said subscribers to whom an attempt is made to initiate a call via a second link;

processing said attempt to initiate said call in a manner based at least in part on processing information in the subscriber profile identified by said speech signal processing including said data indicative of subscription to messaging service;

establishing a speech link between said second link and said messaging system; and storing in said designated storage capability in said messaging system a message transmitted via said second link.

19. A method according to claim 18 wherein said subscriber profile identified by said speech signal processing is selected from said subscriber profiles assigned to said multiple subscribers associated with said first of said links by a virtual equipment designation.

20. A method according to claim 18 including the steps of assigning virtual office equipment designations to each of said subscriber profiles, and selecting from said subscriber profiles said subscriber profile identified by said speech signal processing by its virtual equipment designation.

21. A method according to claim 20 including the steps of assigning to said first link an office equipment designation designating office equipment in a switching system in said multilink telecommunication network, which switching system serves said first link, said office equipment designation identifying a further customer profile, and identifying through speech signal processing the subscriber profile of said one of said subscribers to whom an attempt is made to initiate a call via said second link pursuant at least in part to information in said further customer profile.

22. A method according to claim 21 including the steps of installing said further customer profile in said switching system responsive to detecting said attempt to initiate a call via said second link, and replacing said further customer profile in said switching system with said customer profile identified through speech signal processing.

23. A method for processing a call in a switched telecommunication network including multiple central office switching systems connected to multiple links comprising the steps of:
- assigning a customer profile to a first of said multiple links corresponding to office equipment in a central office switching system serving said first link;
- assigning additional subscriber profiles to multiple subscribers associated with said first link;
- at least one of said additional subscriber profiles including data indicative of subscription to messaging service;
- designating in a messaging system a storage capability for said at least one additional subscriber profile;
- installing in said switching system serving said first link said customer profile assigned to said first link;
- pursuant at least in part to information in said installed customer profile identifying through speech signal processing the subscriber profile of one of said subscribers to whom an attempt is made to initiate a call via a second link;
- substituting for said installed customer profile said customer profile identified through speech signal processing;
- processing said attempt to initiate said call in a manner based at least in part on processing information in the substituted subscriber profile identified by said speech signal processing including said data indicative of subscription to messaging service;
- establishing a speech link between said second link and said messaging system; and
- storing in said designated storage capability in said messaging system a message transmitted via said second link.

24. A method according to claim 23 wherein said additional customer profiles are designated by virtual office equipment designations associated with said office equipment for said first link.

25. A method according to claim 24 wherein said speech signal processing comprises recognizing the utterance of a name.

26. A method according to claim 25 wherein said utterance of said name emanates from the party attempting to initiate said call.

27. A method according to claim 24 including the step of transmitting said stored message responsive to speech signal processing identification of a party retrieving said message.

28. A method according to claim 27 wherein said speech signal processing identification of a party retrieving said message is responsive at least in part to information in said customer profile corresponding to said office equipment for said first link.

29. A method according to claim 28 wherein said step of transmitting said stored message responsive to speech signal processing identification of a party retrieving said message is responsive at least in part to information in said customer profile identified by a virtual office equipment designation assigned to said party retrieving said message.

30. A method comprising:
- detecting a request to make a voice call from a first link to a second link through a communication network including multiple central office switching systems connected to multiple links;
- installing in the central office switching system serving said second link a first service profile corresponding to said second link;
- pursuant to said first service profile identifying one of multiple parties available via said second link by processing signals resulting from speech transmitted via said first link;
- responsive to said identification installing in the central office switching system serving said second link a second service profile corresponding to said one party;
- pursuant at least partially to information in said second service profile storing a voice message from said first link in message storage associated with said second link and with said one party for retrieval by said one party.

31. A method according to claim 30 wherein said first service profile corresponds to designated office equipment in said central office switching system serving said second link.

32. A method according to claim 31 wherein said second service profile corresponds to designated virtual office equipment in said central office switching system serving said second link.

33. A method according to claim 32 wherein said second service profile is substituted for said first service profile in said central office switching system serving said second link.

34. A method according to claim 30 including the steps of:
- detecting a request for service over said second link;
- installing said first service profile in said central office switching system serving said second link;
- responsive to a voice signal over said second link substituting said second service profile for said first service profile in said central office switching system serving said second link;
- pursuant at least partially to information in said second service profile transmitting said stored voice message via said second link.

35. A method according to claim 33 including the steps of:
- detecting a request for service over said second link;
- installing said first service profile in said central office switching system serving said second link;
- responsive to a voice signal over said second link substituting said second service profile for said first service profile in said central office switching system serving said second link;
- pursuant at least partially to information in said second service profile transmitting said stored voice message via said second link.

36. A communication network comprising:
- multiple central office switching systems connected to multiple links, said links including a first and a second link, said second link having multiple subscribers associated therewith;
- a control network connected to said central office switching systems;
- a speech signal processing facility; and
- a message storage facility;
- wherein responsive to initiation of a request to establish a connection from said first to said second links, a connection is established to said speech signal processing facility, the identity of one of said subscribers associated with said second link is established via said speech signal processing facility, a virtual office equipment designation identifying a service profile of said one subscriber is associated with the switching system to which said second link is connected, pursuant at least partially to information in said service profile storing a voice message from said first link in said message storage facility for retrieval by said identified subscriber.

37. A communication network comprising:

multiple central office switching systems connected to multiple links, said links including a first and a second link, said second link having multiple subscribers associated therewith;

a speech signal processing facility; and a message storage facility;

a signaling and control network connected to said central office switching systems, said speech signal processing facility; and said message storage facility;

wherein responsive to initiation of a request to establish a connection from said first to said second links, a connection is established to said speech signal processing facility, the identity of one of said subscribers associated with said second link is established, a virtual office equipment designation identifying a service profile of said one subscriber is associated with the switching system to which said second link is connected, pursuant at least partially to information in said service profile storing a voice message from said first link in said message storage facility for retrieval by said identified subscriber.

38. A communication network comprising:

multiple central office switching systems connected to multiple links, said links including a first and a second link, said second link having multiple subscribers associated therewith;

a speech signal processing facility;

a message storage facility;

a signaling and control network connected to said central office switching systems, said speech signal processing facility; and said message storage facility;

wherein responsive to initiation of a request to establish a connection from said first to said second links, a first service profile corresponding to said second link is installed in the central office switching system serving said second link and pursuant at least partially to information in said first service profile connection is established to said speech signal processing facility, the identity of one of said subscribers associated with said second link is established, a second service profile corresponding to said one subscriber is installed in said central office switching system serving said second link, pursuant at least partially to information in said second service profile a voice message from said first link is stored in message storage associated with said second link for retrieval by said one party.

39. A system according to claim 38 wherein said switching systems are connected in a telecommunications network.

40. A system according to claim 39 wherein responsive to detecting a request for service over said second link subsequent to storage of said message, said first service profile in installed in said central office switching system serving said second link, responsive to an utterance over said second link, said second service profile is substituted for said first service profile in said central office switching system serving said second link, and pursuant at least partially to information in said second service profile said stored voice message is transmitted via said second link.

41. A method comprising:

detecting a request to make a voice call from a first link to a second link through a communication network including multiple central office switching systems connected to multiple links;

installing in the central office switching system serving said second link a service profile generic to said second link;

pursuant to said generic service profile identifying one of multiple parties available via said second link by processing signals resulting from speech transmitted via said first link;

responsive to said identification installing in the central office switching system serving said second link a service profile specific said one party;

pursuant at least partially to information in said specific service profile storing a voice message from said first link in message storage associated with said second link and with said one party for retrieval by said one party.

\* \* \* \* \*